(12) United States Patent
Kojima et al.

(10) Patent No.: US 11,340,493 B2
(45) Date of Patent: May 24, 2022

(54) DISPLAY DEVICE

(71) Applicant: Japan Display Inc., Tokyo (JP)

(72) Inventors: Tetsuya Kojima, Tokyo (JP); Mitsutaka Okita, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/123,229

(22) Filed: Dec. 16, 2020

(65) Prior Publication Data

US 2021/0232001 A1  Jul. 29, 2021

(30) Foreign Application Priority Data

Jan. 27, 2020 (JP) .............................. JP2020-010648

(51) Int. Cl.
*G02F 1/1335* (2006.01)
*G02F 1/1333* (2006.01)
*G02F 1/13357* (2006.01)
*G02F 1/13363* (2006.01)

(52) U.S. Cl.
CPC .... *G02F 1/133528* (2013.01); *G02F 1/13338* (2013.01); *G02F 1/13363* (2013.01); *G02F 1/133602* (2013.01); *G02F 1/133638* (2021.01)

(58) Field of Classification Search
CPC .................................................. G02F 1/133638
See application file for complete search history.

(56) References Cited

U.S. PATENT DOCUMENTS

2020/0301188 A1* 9/2020 Araki ................ G02F 1/134309

FOREIGN PATENT DOCUMENTS

| CN | 109545099 A | * | 3/2019 |
| JP | 2869452 B2 | | 3/1999 |
| JP | 2010-015015 A | | 1/2010 |

* cited by examiner

*Primary Examiner* — Alexander P Gross
(74) *Attorney, Agent, or Firm* — Oblon, McClelland, Maier & Neustadt, L.L.P.

(57) ABSTRACT

Disclosed is a display device including an array substrate, a liquid crystal layer over the array substrate, a counter substrate over the liquid crystal layer, a first resin film located under the array substrate and having a first opening overlapping with the liquid crystal layer, a first wavelength plate in the first opening, and a first linear polarizing plate located under and overlapping with the first resin film and the first wavelength plate. The first resin film may be in contact with or spaced apart from the first wavelength plate.

20 Claims, 17 Drawing Sheets

324

FIG. 11A
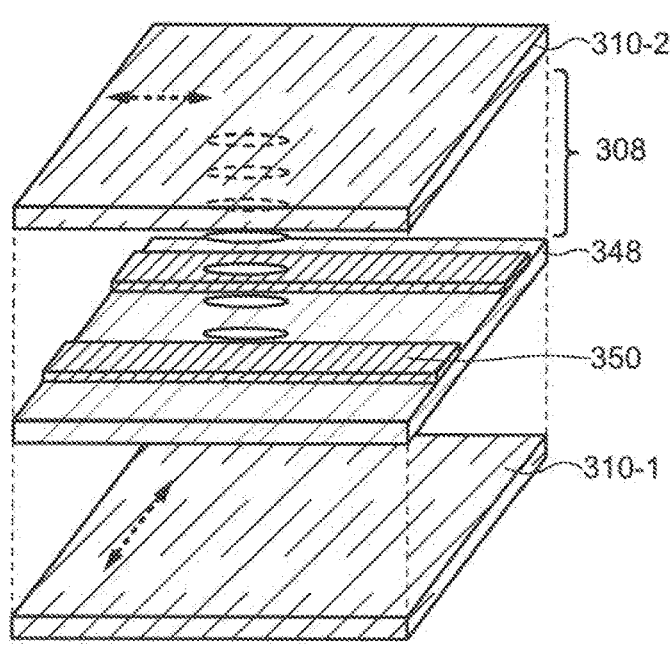
FIG. 11B
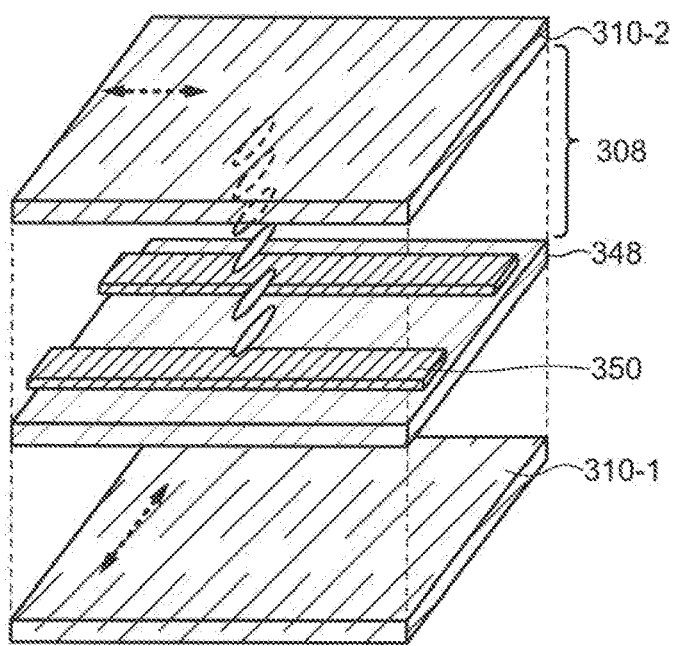

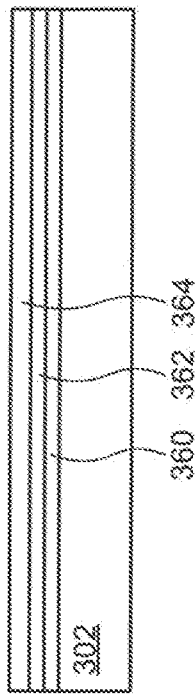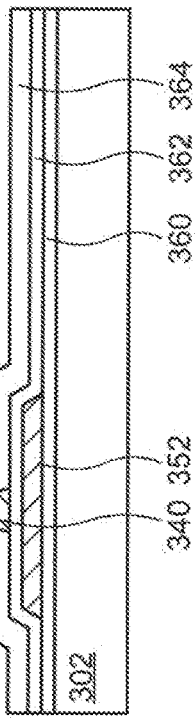
FIG. 13A
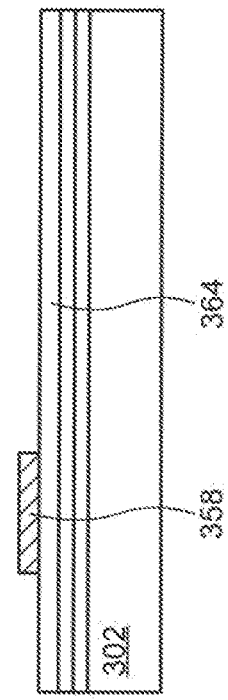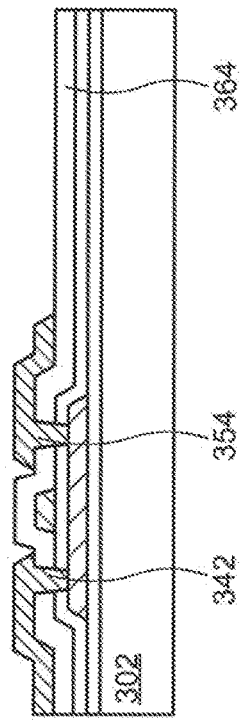
FIG. 13B
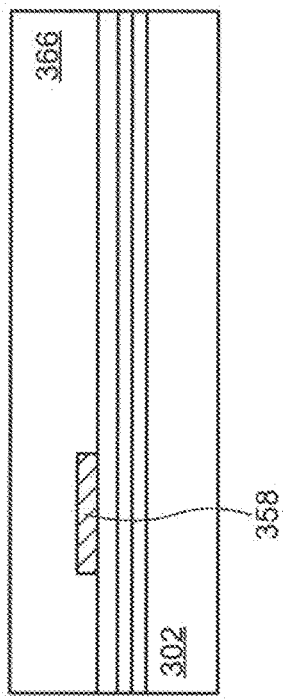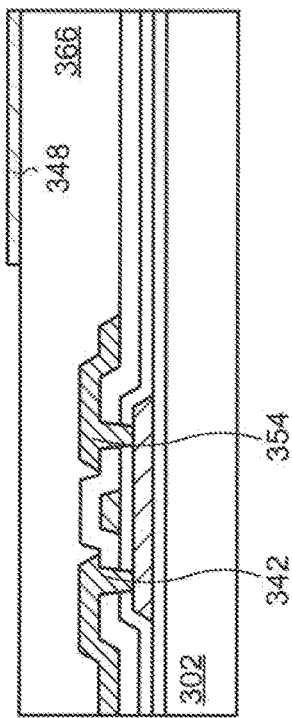
FIG. 13C

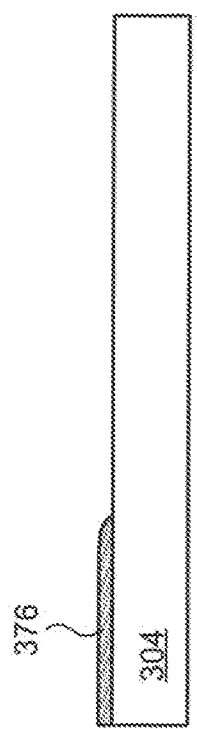
FIG. 15A
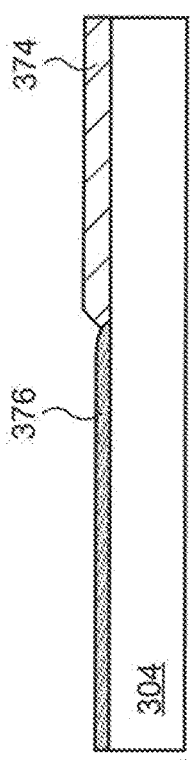
FIG. 15B
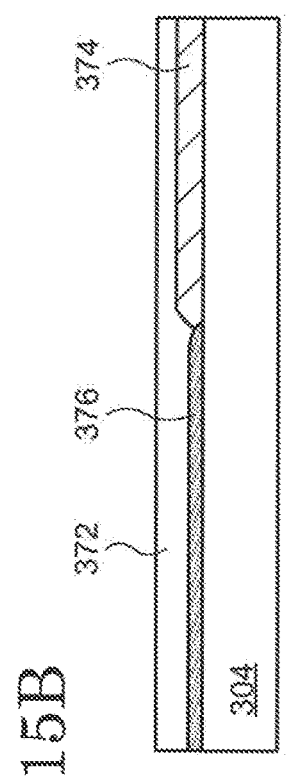
FIG. 15C
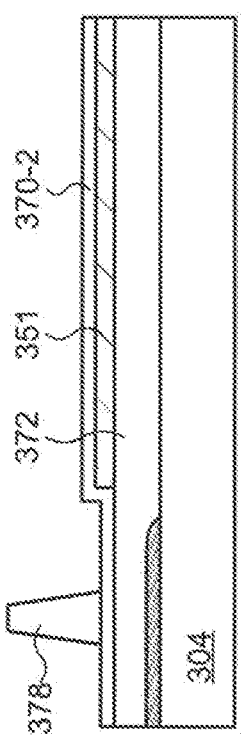
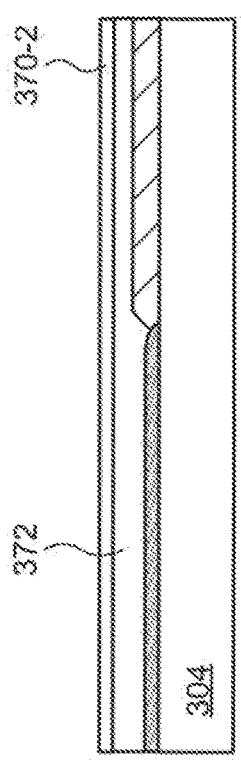

DISPLAY DEVICE

CROSS REFERENCE TO RELATED APPLICATIONS

This application is based on and claims the benefit of priority from the prior Japanese Patent Application No. 2020-010648, filed on Jan. 27, 2020, the entire contents of which are incorporated herein by reference.

BACKGROUND OF THE INVENTION

Field

An embodiment of the present invention relates to a display device and a manufacturing method of the display device. For example, an embodiment of present invention relates to a display device with a pixel including a liquid crystal element and a manufacturing method thereof.

Description of the Related Art

In recent years, many small-size portable electronic terminals having a display function are designed so that a region (frame region or peripheral region) other than a display region is as small as possible in order to expand the display region for improved display visibility and designability. According to such a design strategy, a region required by the elements supporting the functions of the electronic terminals, such as an image-capturing element, a sensor, and an audio inputting/outputting device, is strictly limited. Hence, it has been proposed to form a cutoff or an opening in a part of a display region and arrange an image-capturing element, a sensor, or the like therein. For example, it is disclosed in Japanese Patent Application Publication No. 2010-15015 and Japanese Patent No. 2869452 that a display device is configured so that the structure or the driving method of a portion of the display region is different from those of the other portion to form a light-transmitting region in the portion of the display region. The use of this light-transmitting region allows a variety of elements to be arranged at a position overlapping with the display region.

BRIEF SUMMARY OF THE INVENTION

An embodiment of the present invention is a display device. The display device includes an array substrate, a liquid crystal layer over the array substrate, a counter substrate over the liquid crystal layer, a first resin film located under the array substrate and having a first opening overlapping with the liquid crystal layer, a first wavelength plate in the first opening, and a first linear polarizing plate located under and overlapping with the first resin film and the first wavelength plate.

An embodiment of the present invention is a manufacturing method of a display device. The manufacturing method includes; arranging a liquid crystal layer between a counter substrate and an array substrate; and fixing a first optical unit to the array substrate. The first optical unit has a first resin film having a first opening, a first wavelength plate in the first opening, and a linear polarizing plate overlapping with the first resin film and the first wavelength plate. Fixing the first optical unit to the array substrate is performed so that the first resin film is located between the array substrate and the linear polarizing plate.

BRIEF DESCRIPTION OF THE DRAWINGS

FIG. 11A and FIG. 11B are schematic perspective views for explaining operation of a display device according to an embodiment of the present invention;

FIG. 13A to FIG. 13C are schematic cross-sectional views showing a manufacturing method of a display device according to an embodiment of the present invention;

FIG. 15A to FIG. 15C are schematic cross-sectional views showing a manufacturing method of a display device according to an embodiment of the present invention;

DETAILED DESCRIPTION OF THE INVENTION

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate. A reference number is used when plural structures which are the same as or similar to each other are collectively represented, while a hyphen and a natural number are added after the reference number when these structures are independently represented.

In the present specification and claims, when a plurality of films is formed by processing one film, the plurality of films may have functions or roles different from each other. However, the plurality of films originates from a film formed as the same layer in the same process and has the same layer structure and the same material. Therefore, the plurality of films is defined as films existing in the same layer.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure.

First Embodiment

In the present embodiment, a structure of a display device 100 according to an embodiment of the present invention is described.

1. Outline Structure

Figure 1:
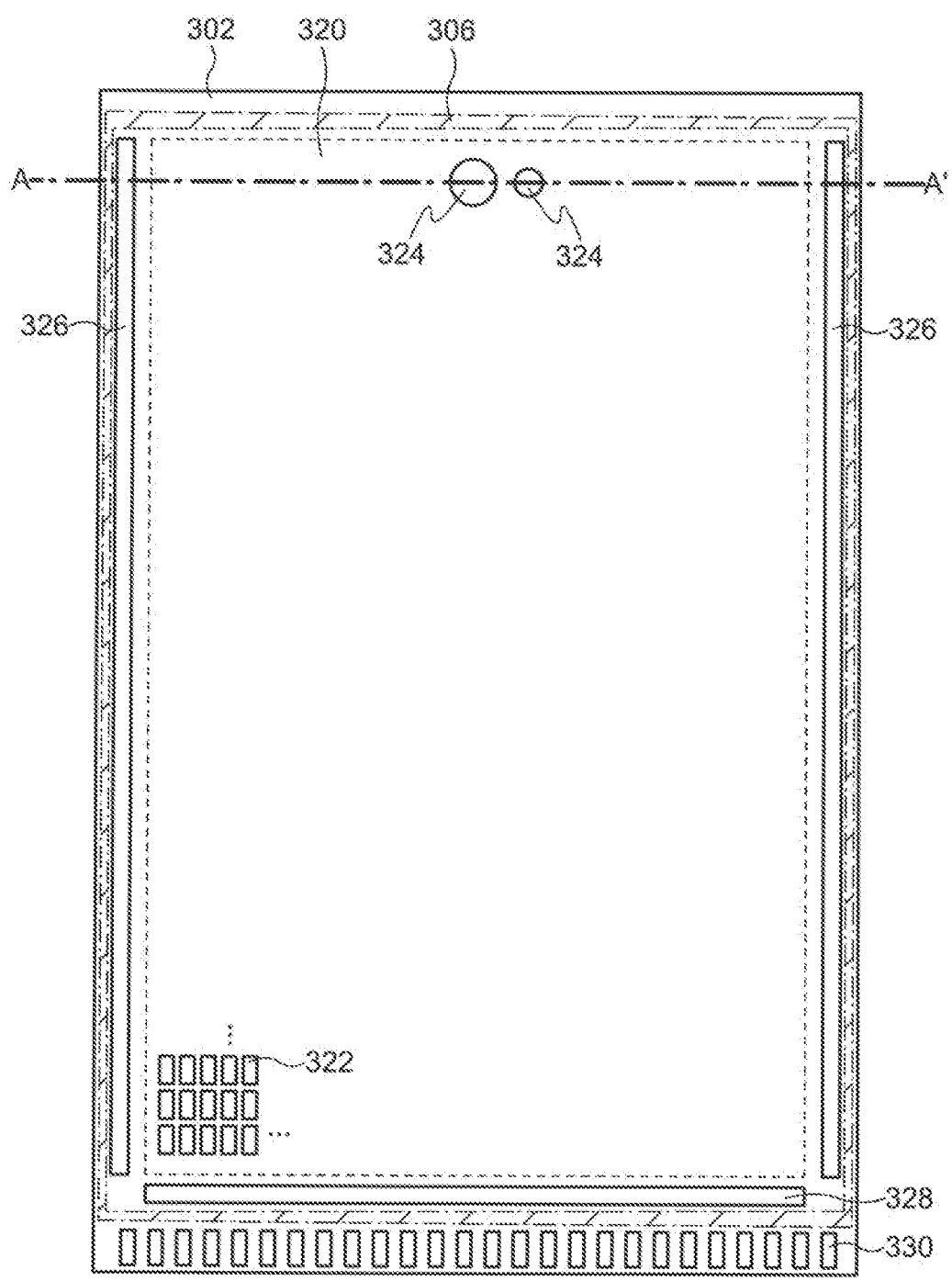
FIG. 1 is a schematic top view of a display device according to an embodiment of the present invention.
Figure 2:
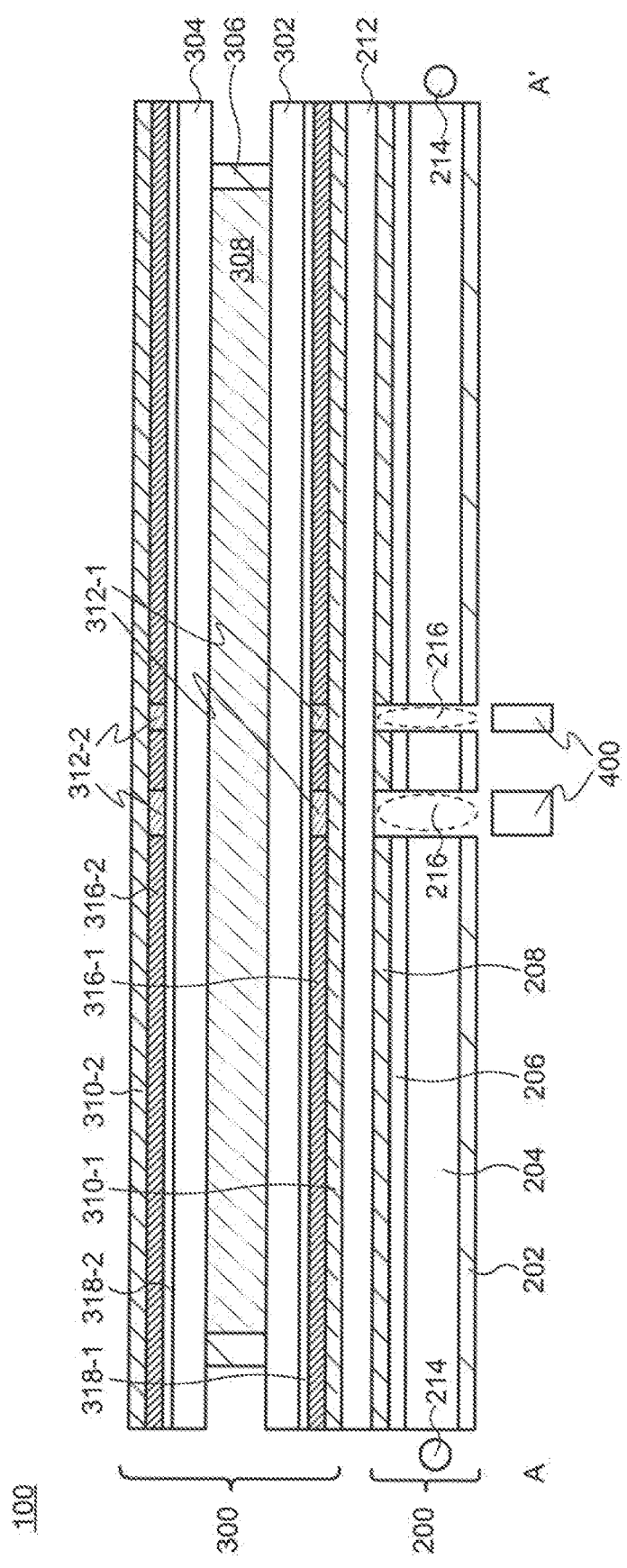
FIG. 2 is a schematic cross-sectional view of a display device according to an embodiment of the present invention.

The outline structure of the display device 100 is explained using FIG. 1 and FIG. 2. FIG. 1 is a schematic top view of the display device 100, and a schematic view of a cross section along a chain line A-A' in FIG. 1 is illustrated in FIG. 2. As shown in FIG. 2, the display device 100 has a display module 300. The display device 100 may further include a backlight unit 200 and a photoelectric transducer 400 underneath the display module 300. In FIG. 2, an example is demonstrated where two photoelectric transducers 400 are provided.

1-1. Display Module

As shown in FIG. 2, the display module 300 has a pair of substrates 302 and 304 fixed to each other with a sealing material 306 and a liquid crystal layer 308 sealed with the pair of substrates 302 and 304 and the sealing material 306. Hereinafter, the substrates 302 and 304 are referred to as an array substrate 302 and a counter substrate 304, respectively. The sealing material 306 is sandwiched by the array substrate 302 and the counter substrate 304 and provides a single closed shape on the array substrate 302 as shown in FIG. 1. The inside of this closed shape is filled with the liquid crystal layer 308. Thus, a single liquid crystal layer 308 is formed in this single space provided by the array substrate 302, the counter substrate 304, and the sealing material 306. A unit composed of this single crystal layer 308, the array substrate 302, the counter substrate 304, and the sealing material 306 is a liquid crystal cell. One display device 100 has a single liquid crystal cell.

The display module 300 further includes a pair of optical units sandwiching the array substrate 302 and the counter substrate 304. The pair of optical units each has a linear polarizing plate 310, a ¼ wavelength plate (hereinafter, referred to as a λ/4 plate) 312, and a resin film 316 and is respectively arranged under the array substrate 302 and over the counter substrate 304. An opening is formed in the resin film 316, and the λ/4 plate 312 is arranged in the opening. The pair of optical units is respectively fixed to the array substrate 302 and the counter substrate 304 with adhesive layers 318 so that the pair of λ/4 plates 312 is sandwiched by the pair of linear polarizing plates 310. Thus, the pair of linear polarizing plates 310 is arranged so as to sandwich the pair of resin films 316 and at least one pair of the λ/4 plates 312. The λ/4 plates 312 are arranged so as to overlap with a through hole 216 formed in the backlight unit 200 explained below. In FIG. 2, an example is shown where two pairs of λ/4 plates 312 respectively overlap with the through holes 216. The detailed structure of the display module 300 will be described below.

1-2. Backlight Unit

As shown in FIG. 2, the backlight unit 200 is disposed under the array substrate 302 and includes, as fundamental elements, a reflecting plate 202, a light-guiding plate 204 over the reflecting plate 202, a light source 214 provided on a side surface of the light-guiding plate 204, and a variety of optical films formed over the light-guiding plate 204. The structures of the optical films are arbitrarily determined, and an optical film in which a prism sheet 206 and a light-diffusing film 208 are combined is demonstrated as an example in FIG. 2. The backlight unit 200 may be fixed to the display module 300 with an adhesive layer 212.

The light source 214 includes a light-emitting element such as a light-emitting diode and a cold-cathode tube. The light-emitting element is preferred to have an emission wavelength covering the whole of the visible light region. The light from the light source 214 enters the light-guide plate 204, and the light-guiding plate 204 is configured to diffuse and reflect the incident light in the inside thereof and to uniformly emit the light in the direction toward the display module 300. The reflecting plate 202 is provided on an opposite side to the display module 300 with respect to the light-guiding plate 204 and is configured to reflect the light radiating to the opposite side to the display module 300 and return the light to the light-guiding plate 204. The prism sheet 206 is provided in order to collect the light emitted from the light-guiding plate 204 and radiate the collected light toward the front of the display module 300, and a plurality of prism-shaped depressions and projections is arranged in a stripe form on a surface thereof, for example. The light-diffusing film 208 is a member for making the light uniform and includes light-diffusing fine particles and a polymer matrix fixing the fine particles.

At least one through hole 216 passing through at least the light-guiding plate 204 and the reflecting plate 202 is formed in the backlight unit 200. The number of the through holes 216 may be the same as the number of the photoelectric transducers 400, and an example is shown in FIG. 2 where two through holes 216 respectively corresponding to two photoelectric transducers 400 are disposed. In the example demonstrated in FIG. 2, although through holes arranged in a position overlapping with the through holes 216 are also formed in the prism sheet 206 and the light-diffusing film 208, it is not always necessary to form these through holes.

1-3. Photoelectric Transducer

The photoelectric transducer 400 is provided so as to overlap with the through hole 216 and the pair of λ/4 plates. In FIG. 2, a state is demonstrated where two photoelectric transducers 400 respectively overlap with the through holes 216. The function and the structure of the photoelectric transducer 400 may be arbitrarily selected, and an image-capturing element such as a CCD (Charge-Coupled Device) image sensor and a CMOS (Complementary Metal Oxide Semiconductor) image sensor, a photosensor, and the like are exemplified.

2. Structure of Display Module

Hereinafter, the structure of the display module 300 is explained in detail.

2-1. Layout

A variety of patterned semiconductor films, insulating films, and conductive films is stacked over the array substrate 302, and a plurality of pixels 322, a dimming element 324, circuits for driving these elements (scanning-line driver circuits 326 and signal-line driver circuit 328), terminals 330, and the like are structured by these films (FIG. 1). An example is demonstrated in FIG. 1 in which two dimming elements 324 are provided. However, the number of the dimming elements 324 is not limited and may be one or three or more dimming elements 324 may be included. As described below, liquid crystal elements different in operation mode from each other are respectively arranged in the pixels 322 and the dimming element 324. Here, a liquid crystal element implies a pair of electrodes and a portion of the liquid crystal layer 308 driven by the pair of electrodes.

The pixel 322 is structured to allow a part of the light from the backlight unit 200 to pass toward the outside of the display device 100. The pixel 322 is a minimum unit providing information of a single color and includes a pixel circuit and the liquid crystal layer 308 overlapping with the pixel circuit as fundamental elements. The arrangement of the plurality of pixels 322 is not limited, and the plurality of pixels 322 may be arranged in a variety of arrangements such as a stripe arrangement, a mosaic arrangement, and a delta arrangement. A region defined by the plurality of pixels 322 is a display region 320. The pixels 322 are arranged so as not to overlap with the thorough hole 216.

Figure 3:
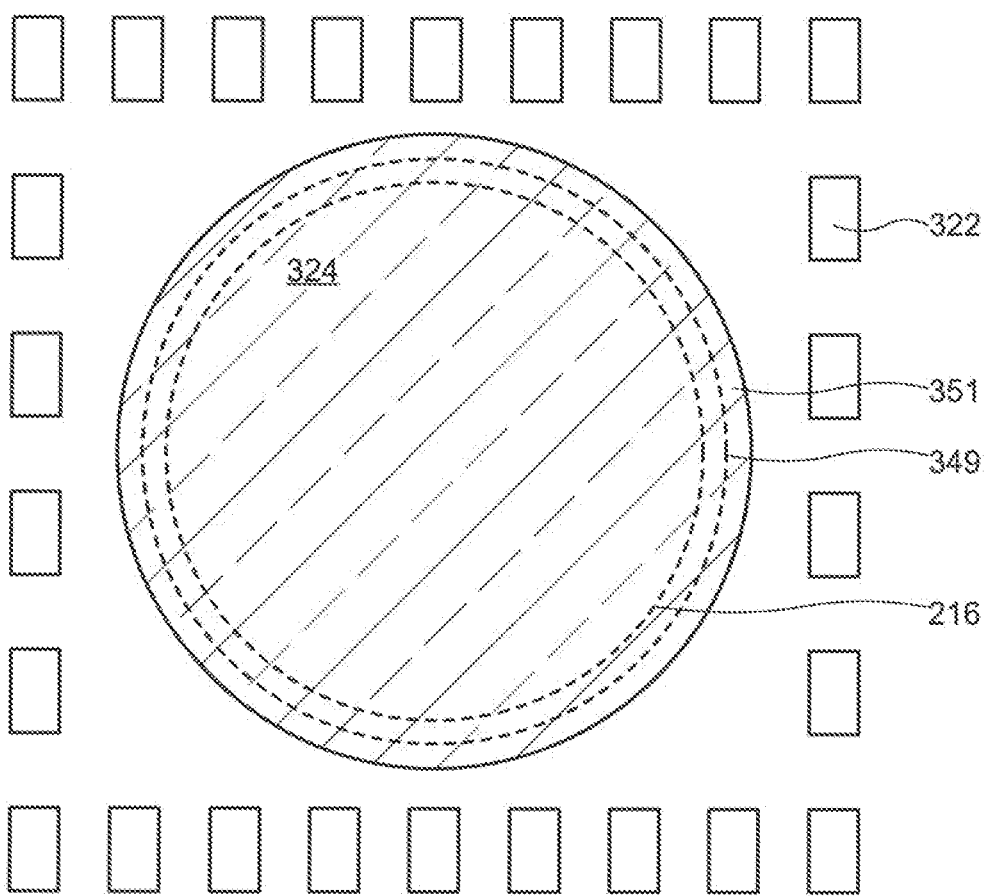
FIG. 3 is a schematic top view of pixels and a dimming element of a display device according to an embodiment of the present invention.

A schematic top view of the dimming element 324 and a part of the display region 320 surrounding the dimming element 324 is shown in FIG. 3. The dimming element 324 is located in the display region 320, and one dimming element 324 is arranged so as to be surrounded by the plurality of pixels 322. The dimming element 324 may be configured so that the size (area) thereof is larger than that of each pixel 322. The shape of the dimming element 324 is not limited to a circular shape as shown in FIG. 3 and may be arbitrarily determined. For example, an arbitrary shape such as a quadrangle including a square, a rectangle, a trapezoid, and the like, a polygon, and an ellipse may be employed.

The dimming element 324 is arranged at the position overlapping with the through hole 216 (FIG. 2). Thus, the dimming element 324 overlaps with the photoelectric transducer 400. A pixel circuit having a different structure from that of the pixel circuit in the pixel 322 is also formed in the dimming element 324, and the dimming element 324 includes this pixel circuit and the liquid crystal layer 308 overlapping with the pixel circuit as fundamental elements. The dimming element 324 has a function to control transmissivity of outside light, which allows the amount of the light incident on the photoelectric transducer 400 to be adjusted.

A variety of signal lines (a gate line, an image-signal line, an initializing signal line, a power-source line, and the like), which is not illustrated, extends from the scanning-line driver circuits 326 and the signal-line driver circuit 328 to the display region 320, and these signal lines are electrically connected to the respective pixels 322 and the dimming element 324. A connector such as a flexible printed circuit substrate (FPC), which is not illustrated, is connected to the terminals 330, and the signals and a power source supplied from an external circuit (not illustrated) are provided to the scanning-line driver circuits 326, the signal-line driver circuit 328, the pixels 322, and the dimming element 324 through the connector and the terminals 330. The scanning-line driver circuits 326 and the signal-line driver circuit 328 operate the pixel circuits in the pixels 322 and the dimming element 324 on the basis of the supplied signals and power source, by which orientation of the liquid crystal molecules in the liquid crystal layer 308 is controlled, the amount of the light provided from the backlight unit 200 is controlled in the pixels 322, and the amount of the incident outside light is controlled in the dimming element 324.

2-2. Pixel

Figure 4:
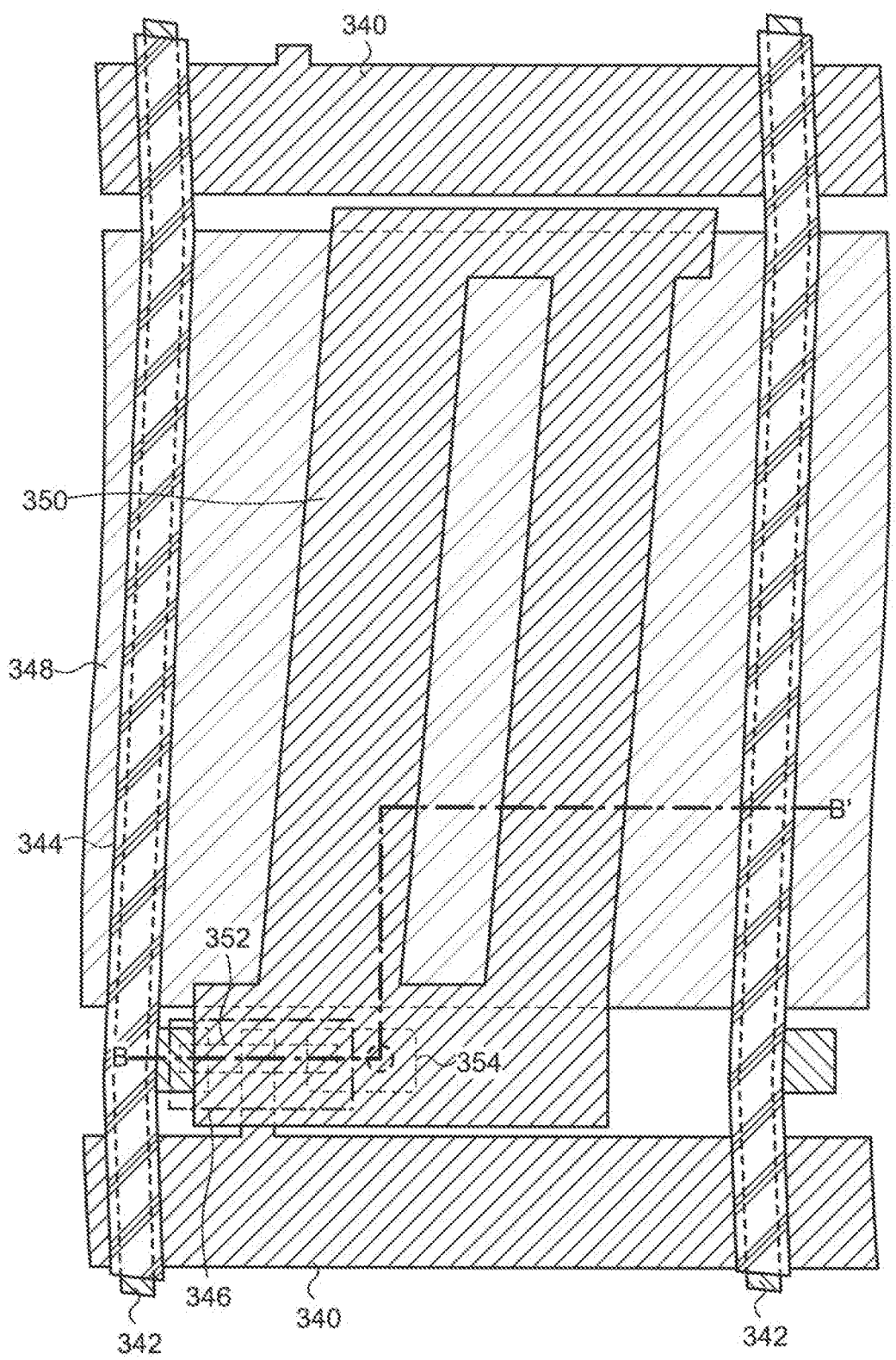
FIG. 4 is a schematic top view of a pixel of a display device according to an embodiment of the present invention.
Figure 5:
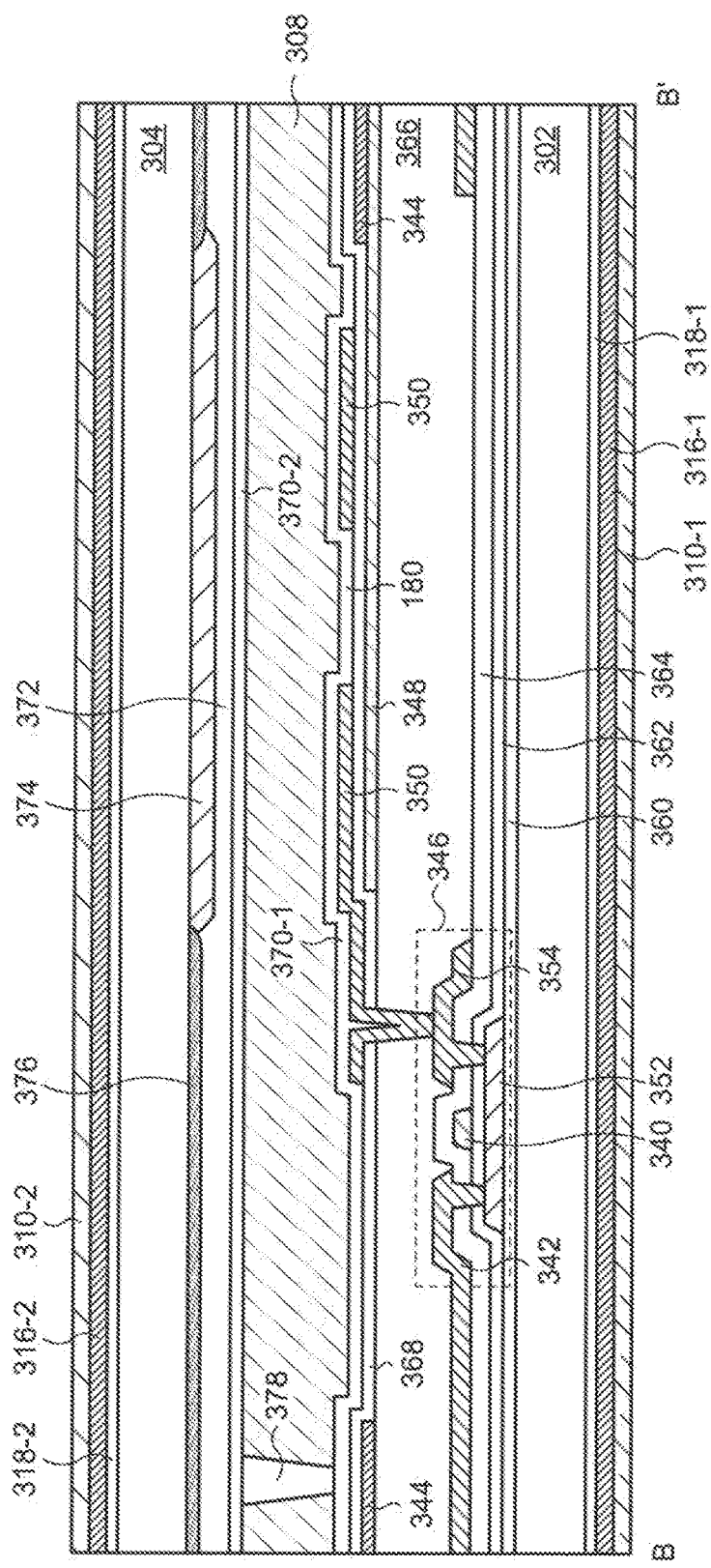
FIG. 5 is a schematic cross-sectional view of a pixel of a display device according to an embodiment of the present invention.

An example of the layout of the pixels 322 is shown in FIG. 4, whereas a schematic view of a cross section along a chain line B-B' in FIG. 4 is shown in FIG. 5. As shown in these figures, the pixel circuit in the pixel 322 includes a pixel electrode 350, a common electrode 348, a transistor 346 electrically connected to the pixel electrode 350, the liquid crystal layer 308 provided over the pixel electrode 350 and the common electrode 348, orientation films (a first orientation film 370-1 and a second orientation film 370-2) sandwiching the liquid crystal layer 308, and the like. The pixel 322 is electrically connected to the gate line 340 extending from the scanning-line driver circuit 326, the image signal line 342 extending from the signal-line driver circuit 342, and the power-source line 344. The pixel circuit shown in these figures is merely an example and may include other elements such as a storage capacitor and another transistor.

As shown in FIG. 5, the pixel circuit is disposed over the array substrate 302 through an undercoat 360. The array substrate 302 includes a material selected from glass, quartz, a plastic containing a polymer such as a polyamide, or the like. The undercoat 360 functions as a protection film for preventing diffusion of impurities in the array substrate 302 and may be composed of one or a plurality of films including a silicon-containing inorganic compound such as silicon oxide and silicon nitride.

The transistor 346 is structured by a semiconductor film 352, a part of a gate insulating film 362, a part of the gate line 340, a part of an interlayer insulating film 364, a part of the image-signal line 342, a drain electrode 354, and the like. A part of the gate line 340 overlapping with the semiconductor film 352 functions as a gate electrode of the transistor 346, while a part of the aforementioned image-signal line 342 functions as a source electrode of the transistor 346. Openings reaching the semiconductor film 352 are formed in the gate insulating film 362 and the interlayer insulating film 364, and the drain electrode 354 and the source electrode are electrically connected to the semiconductor film 352 through these openings. In the example demonstrated here, the transistor 346 is a top-gate type transistor. However, the transistor 346 may be a transistor having another structure (a bottom-gate type transistor, etc.).

A leveling film 366 is disposed over the transistor 346, by which depressions and projections formed by the transistor 346 are absorbed to provide a flat surface. The leveling film 366 includes a polymer material such as an acrylic resin, an epoxy resin, a polysiloxane resin, and a polyamide.

The common electrode 348 is arranged over the leveling film 366. The common electrode 348 is formed to be shared by the plurality of pixels 322. For example, the common electrode 348 is arranged parallel to the gate line 340 and shared by the plurality of pixels 322 connected to one gate line 340 as shown in FIG. 4. Although not illustrated, the common electrode 348 may be arranged parallel to the image-signal line 342 to be shared by the plurality of pixels 322 connected to one image-signal line 342 or may be formed to be shared by all of the pixels 322.

The power-source line 344 in contact with the common electrode 348 is disposed over the common electrode 348. The power-source line 344 may be arranged to overlap with the image-signal line 342. The image-signal line 342A is supplied with a potential (Vcom) slightly lower than an intermediate potential between the maximum and minimum potentials, for example, and this potential is provided to the common electrode 348. Although not illustrated, the power-source line 344 may be arranged under the common electrode 348.

The pixel electrode 350 is formed over the common electrode 348 and the power-source line 344 through an interelectrode insulating film 368. The pixel electrode 350 is electrically connected to the drain electrode 354 through an opening formed in the leveling film 366 and the interelectrode insulating film 368. With this structure, the image signal supplied to the image-signal line 342 is provided to the pixel electrode 350 through the transistor 346, and the potential of the pixel electrode 350 is independently controlled for every pixel 322 in accordance with the image signal. As shown in FIG. 4, the pixel electrode 350 has a slit having a closed shape, and a part of the common electrode 348 is exposed from the slit. Although not illustrated, the pixel electrode 350 may have a cutoff instead of a slit. Alternatively, the pixel electrode 350 may simultaneously have a slit and a cutoff. Note that a slit is an opening formed in the pixel electrode 350 and having a closed shape, and its outer circumference corresponds to an internal circumference of the pixel electrode 350. When this outer circumference of the opening is a part of an outer circumference of the pixel electrode 350, the opening is defined as a cutoff.

The first orientation film 370-1 is disposed over the pixel electrode 350. The first orientation film 370-1 has a polymer such as a polyimide, and a surface thereof is adjusted to control the orientation of the liquid crystal molecules included in the liquid crystal layer 308. Specifically, a rubbing treatment is performed on the surface of the first orientation film 370-1. Alternatively, the first orientation film 370-1 is formed using a photo-curable resin having liquid crystalline units, and polarized ultraviolet light is applied once or a plurality of times in order to orient the liquid crystalline units in the first orientation film 370-1. Alternatively, a film of a photo-decomposable type polyimide or the like may be formed, and then polarized ultraviolet light may be applied thereto. Hereinafter, the treatments for orientation control performed on the orientation films 370 are collectively referred to an orientation treatment. The direction in which the liquid crystal molecules orient over the first orientation film 370-1, which is subjected to the orientation treatment, in the absence of an electric field is referred to an orientation treatment direction.

A color filter 374 and a black matrix 376 are formed over the counter substrate 304. A color is provided to the light from the backlight unit 200 by the color filter 374, which enables the pixel 322 to provide color information. The color filter 374 is configured so that optical properties thereof are different between the adjacent pixels 322. The black matrix 376 is configured to exhibit a low transmissivity with respect to visible light or to substantially not transmit visible light at all and is formed so as to cover the transistor 346, the image-signal line 342, and the gate line 340. As an optional element, an overcoat 372 covering the color filter 374 and the black matrix 376 may be disposed over the counter substrate 304. The counter substrate 304 further has the second orientation film 370-2 covering the color filter 374 and the black matrix 376. Similar to the first orientation film 370-1, the orientation treatment is also performed on the second orientation film 370-2, and the orientation treatment direction thereof is the same as that of the first orientation film 370-1.

The liquid crystal layer 308 is provided between the array substrate 302 and the counter substrate 304, and the pixel electrode 350, the common electrode 348, the first orientation film 370-1, and the second orientation film 370-2 are sandwiched by the array substrate 302 and the counter electrode 304. The liquid crystal layer 308 includes a liquid crystal exemplified by a positive-type liquid crystal having a positive dielectric anisotropy. As described above, the liquid crystal layer 308 is sealed in the space formed by the sealing material 306, the array substrate 302, and the counter substrate 304, and the display device 100 has a single liquid crystal cell. Hence, one liquid crystal layer 308 is shared by all of the pixels 322 and the dimming element 324.

A distance between the array substrate 302 and the counter substrate 304 is controlled by a spacer 378 formed over the array substrate 302, for example. The spacer 378 includes a polymer such as an acrylic resin and an epoxy resin and is formed for every pixel 322 or for each of a plurality of pixels 322. The spacer 378 may be formed over the array substrate 302. Alternatively, a sphere spacer which is not fixed to the array substrate 302 and the counter substrate 304 may be used.

As described above, the display device 100 has the pair of resin films 316 (a first resin film 316-1 and a second resin film 316-2) and the pair of linear polarizing plates 310 (a first linear polarizing plate 310-1 and a second linear polarizing plate 310-2), and these components are respectively fixed to a lower surface of the array substrate 302 and an upper surface of the counter substrate 304 with the pair of adhesive layers (a first adhesive layer 318-1 and a second adhesive layer 318-2). The pair of resin films 316 and the pair of linear polarizing plates 310 overlap with the display region 320 and are arranged so as to sandwich the pixels 322. More specifically, the pair of resin films 316 is arranged so as to sandwich the array substrate 302 and the counter substrate 304 and overlap with the pixel electrode 350 and the common electrode 348, whereas the pair of linear polarizing plates 310 is arranged so as to sandwich the pair of resin films 316 and overlap with the pixel electrode 350 and the counter electrode 348. In the display device 100, the pair of linear polarizing plates 310 has a crossed Nichol relationship. That is, the pair of linear polarizing plates 310 is arranged so that the transmission axes thereof perpendicularly intersect with each other.

The linear polarizing plate 310 may have a known structure. Typically, a polarizing plate having a structure in which an iodine-absorbing thin film of poly(vinyl alcohol) extended in a single direction is sandwiched with a cellulose-based polymer such as triacetylcellulose may be used. The linear polarizing plate 310 may further have a protection film including a polyester such as poly(ethylene terephthalate) on one or both surfaces thereof. Since the λ/4 plate may have the known structure, a detailed explanation is omitted.

The resin film 316 is a film containing a polymer capable of transmitting visible light and includes a material selected from an epoxy resin, an acrylic resin, a silicon resin, a cellulose-based polymer such as triacetylcellulose, a polyester such as poly(ethylene terephthalate) and poly(ethylene naphthalate), and the like. In each optical unit, the resin film 316 may be in contact with the linear polarizing plate 310. The resin film 316 may not have a light-polarizing property. That is, the resin film 316 may not have a transmission axis.

In each pixel 322, the initial orientation of the liquid crystal molecules included in the liquid crystal layer 308 is mainly determined by the orientation treatment directions of the first orientation film 370-1 and the second orientation film 370-2. In the absence of an electric field, the liquid crystal molecules orient along the orientation treatment directions substantially parallel to a surface of the array substrate 302. When a potential difference is provided between the pixel electrode 350 and the common electrode 348, this initial orientation varies. That is, the electric field generated between the pixel electrode 350 and the common electrode 348 and substantially parallel to the surface of the array substrate 302 causes the liquid crystal molecules to rotate in a plane substantially parallel to the surface of the array substrate 302. Accordingly, the orientation direction of the liquid crystal molecules changes, and the control of this change with the potential difference between the pixel electrode 350 and the common electrode 348 enables the light transmissivity of the liquid crystal layer 308 to be controlled, thereby realizing gradation display. Accordingly, an FFS (Fringe Field Switching) liquid crystal element is formed in each pixel 322.

Although not illustrated, the liquid crystal element in each pixel 322 may be an IPS (In-Plane Switching) liquid crystal element. In this case, the common electrode 348 also has a slit and/or a cutoff, and the pixel 322 is configured so that the common electrode 348 exists in the same layer as the pixel electrode 350.

2-3. Dimming Element

Figure 6:
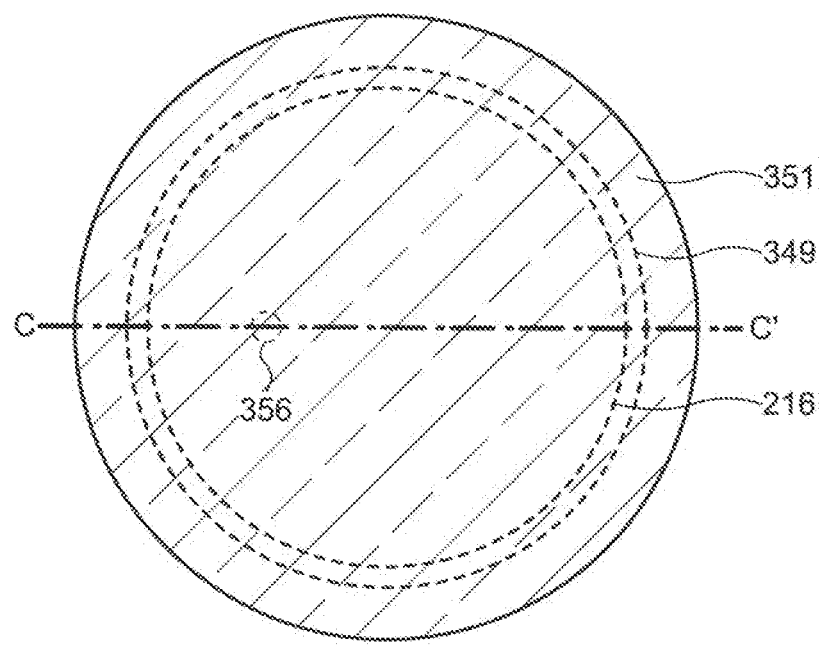
FIG. 6 is a schematic top view of a dimming element of a display device according to an embodiment of the present invention.
Figure 7:
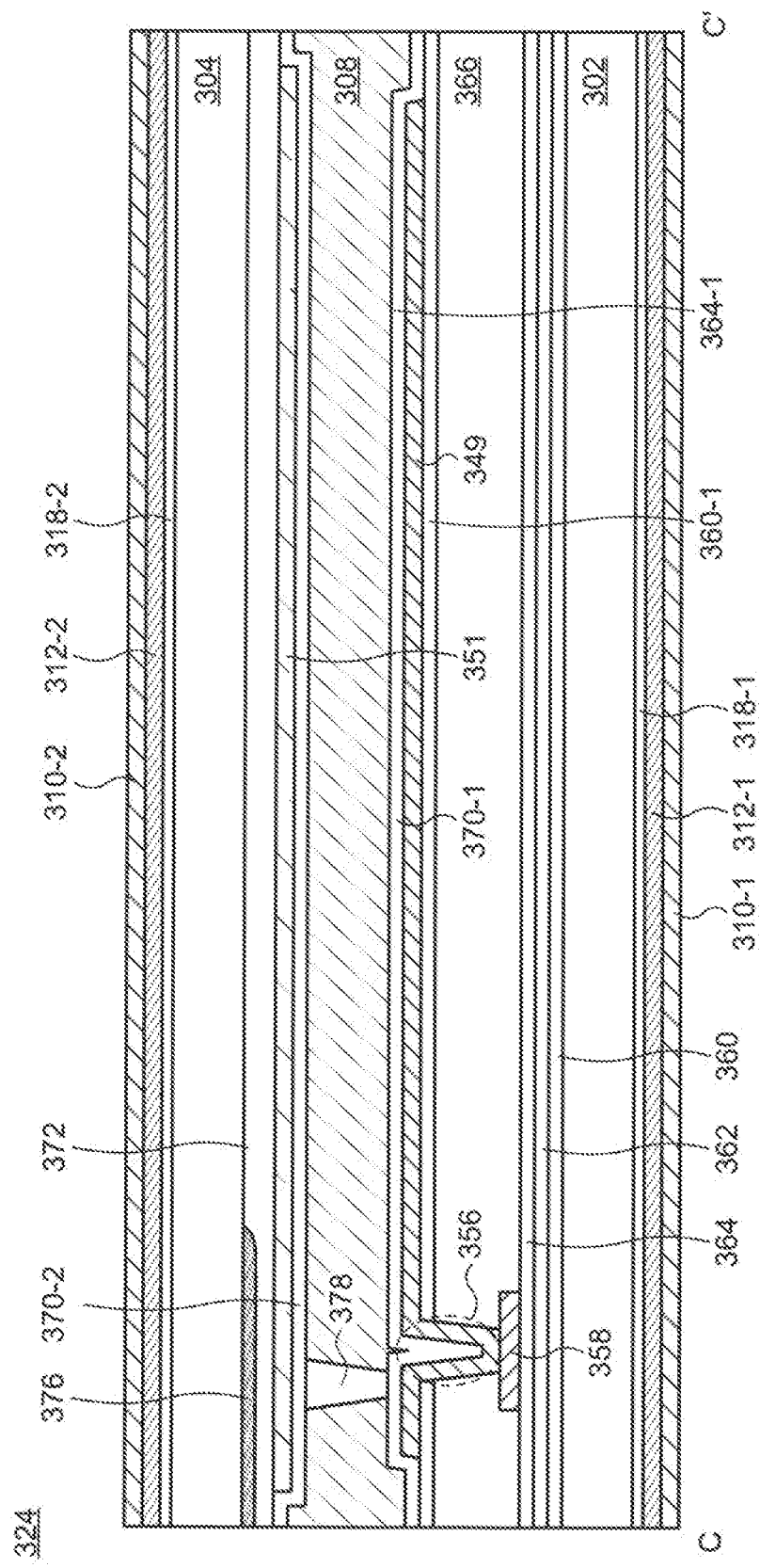
FIG. 7 is a schematic cross-sectional view of a dimming element of a display device according to an embodiment of the present invention.

A top view of the dimming element 324 is shown in FIG. 6, whereas a schematic view of a cross section along a chain line C-C' in FIG. 6 is shown in FIG. 7. In FIG. 6, the λ/4 plates 312 and the linear polarizing plates 310 included in the optical unit are not illustrated. As demonstrated in these figures, the pixel circuit of the dimming element 324 includes a lower electrode 349, an upper electrode 351 overlapping with the lower electrode 349, and the liquid crystal layer 308 arranged between the lower electrode 349 and the upper electrode 351. The dimming element 324 is electrically connected to a dimming-controlling line 358 extending from the signal-line driver circuit 328. The dimming-controlling line 358 is provided with a dimming-controlling signal from the signal-line driver circuit 328, and a potential of this signal is supplied to the lower electrode 349 through the dimming-controlling line 358. The lower electrode 349 may be formed so as to cover the whole of the through hole 326 as shown in FIG. 6. Alternatively, although not illustrated, the lower electrode 349 may be formed so as to cover the whole of the light-receiving surface of the photoelectric transducer 400.

Similar to the pixel circuit of the pixel 322, the pixel circuit of the dimming element 324 is also disposed over the array substrate 302 through the undercoat 360. The dimming element 358 is formed over the array substrate 302 via the undercoat 360 as well as the gate insulating film 362 and the interlayer insulating film 364 extending from the pixel 322, over which the leveling film 366 is arranged. An opening 356 reaching the dimming-controlling line 358 is formed in the leveling film 366, and the lower electrode 349 is arranged over the leveling film 366 so as to cover this opening 356, by which the lower electrode 349 and the dimming-controlling line 358 are electrically connected to each other. In the present embodiment, one lower electrode 349 is arranged in one dimming element 324. In other words, one liquid crystal element including one lower electrode 349, one upper electrode 351 overlapping with the lower electrode 349, and a part of the liquid crystal layer 308 therebetween are formed in one dimming element 324.

The lower electrode 349 is covered by the first orientation film 370-1 extending from the pixel 322. Therefore, the first orientation film 370-1 is shared by the pixel 322, and the orientation treatment direction thereof is the same as that in the pixel 322.

The counter substrate 304 is provided with the upper electrode 351. The upper electrode 351 may be configured so that the same potential (Vcom) as that of the common electrode 348 is supplied or a potential different from that of the common electrode 348 is supplied. When the overcoat 372 is disposed in the pixel 322, the upper electrode 351 is formed over the counter electrode 304 through the overcoat 372. The second orientation film 370-2 extending from the pixel 322 and covering the upper electrode 351 is also formed over the counter substrate 304. Similar to the first orientation film 370-1, this second orientation film 370-2 is also shared by the pixel 322, and the orientation treatment direction thereof is the same as that in the pixel 322. Note that the color filter 374 may not be formed in the dimming element 324. In this case, the overcoat 372 may be in contact with the counter substrate 304 as shown in FIG. 7. The black matrix 376 may be formed in the dimming element 324 so as to overlap with the dimming-controlling line 358, for example. Although not illustrated, similar to the pixels 322, a transistor electrically connected to the lower electrode 349 and the dimming-controlling line 358 may be provided therebetween to supply the dimming-controlling signal to the lower electrode 349 through the transistor.

The liquid crystal layer 308 is arranged between the lower electrode 349 and the upper electrode 351, and the lower electrode 349, the upper electrode 351, the first orientation film 370-1, and the second orientation film 370-2 are sandwiched by the array substrate 302 and the counter substrate 304. As described above, the sealing material 306 forms a single closed shape over the array substrate 302. Hence, the liquid crystal layer 308 is not divided between the dimming element 324 and the pixel 322 and is shared by the dimming element 324 and the pixel 322. Similar to the pixel 322, the spacer 378 may be disposed in the dimming element 324 to maintain the distance between the lower electrode 349 and the upper electrode 351.

As described above, the display device 100 has the pair of linear polarizing plates 310 and the pair of λ/4 plates 312. The pair of λ/4 plates (a first λ/4 plate 312-1 and a second λ/4 plate 312-2) is respectively arranged under the array substrate 302 and over the counter substrate 304 to sandwich the dimming element 324. The pair of λ/4 plates 312 does not overlap with the pixel 322. In other words, the pixels 322 are exposed from the pair of λ/4 plates 312. The slow axes of the pair of λ/4 plates 312 perpendicularly intersect with each other. As described above, the λ/4 plates 312 are arranged in the openings formed in the resin films 316. Hence, the resin films 316 are disposed so as not to overlap with the whole of the dimming element 324 or the lower electrode 349.

In addition, the pair of linear polarizing plates 310 is respectively disposed under the array substrate 302 and over the counter substrate 304 to sandwich the dimming element 324 and the pair of λ/4 plates 312. Therefore, in the region where the dimming element 324 is formed, the pair of linear polarizing plates 310 and the pair of λ/4 plates 312 overlap with each other, and the latter is sandwiched by the former. Since the pair of linear polarizing plates 310 is arranged so as to overlap with the pixels 322, the pair of linear polarizing plates 310 is shared by the pixels 322 and the dimming element 324. Similar to the pixel 322, the transmission axes of the pair of linear polarizing plates 310 also perpendicularly intersect with each other in the dimming element 324. Moreover, the direction of the transmission axis of the first linear polarizing plate 310-1 is the same between the pixels 322 and the dimming element 324, and the direction of the transmission axis of the second linear polarizing plate 310-2 is also the same between the pixel 322 and the dimming element 324. The slow axes of the pair of λ/4 plates 312 respectively shift from the transmission axes of the pair of linear polarizing plates 310 by 45°.

In the dimming element 324, the initial orientation of the liquid crystal molecules included in the liquid crystal layer 308 is also mainly determined by the orientation treatment directions of the first orientation film 370-1 and the second orientation film 370-2. In the absence of an electric field, the liquid crystal molecules orient along the orientation treatment direction substantially parallel to the surface of the array substrate 302. Since the orientation treatment directions of the orientation films 370 are the same as each other between the pixel 322 and the dimming element 324, the orientation direction of the liquid crystal molecules is also the same as each other. When a potential difference is provided between the lower electrode 349 and the upper electrode 351, this initial orientation varies. That is, the electric field generated between the lower electrode 349 and the upper electrode 351 and substantially perpendicular to the surface of the array substrate 302 causes the liquid crystal molecules to be raised (tilted) from the surface of the array substrate 302 so as to be diagonally or perpendicularly oriented from the surface. The control of this change in orientation state with the potential difference between the lower electrode 349 and the upper electrode 351 enables the control of the light transmissivity of the liquid crystal layer 308. Accordingly, an ECB (Electrically Controlled Birefringence) liquid crystal element is formed in the dimming element 324. Hence, the display device 100 has two kinds of liquid crystal element different in operation mode.

2-4. Arrangement of λ/4 Plate and Resin Film

Figure 8A:
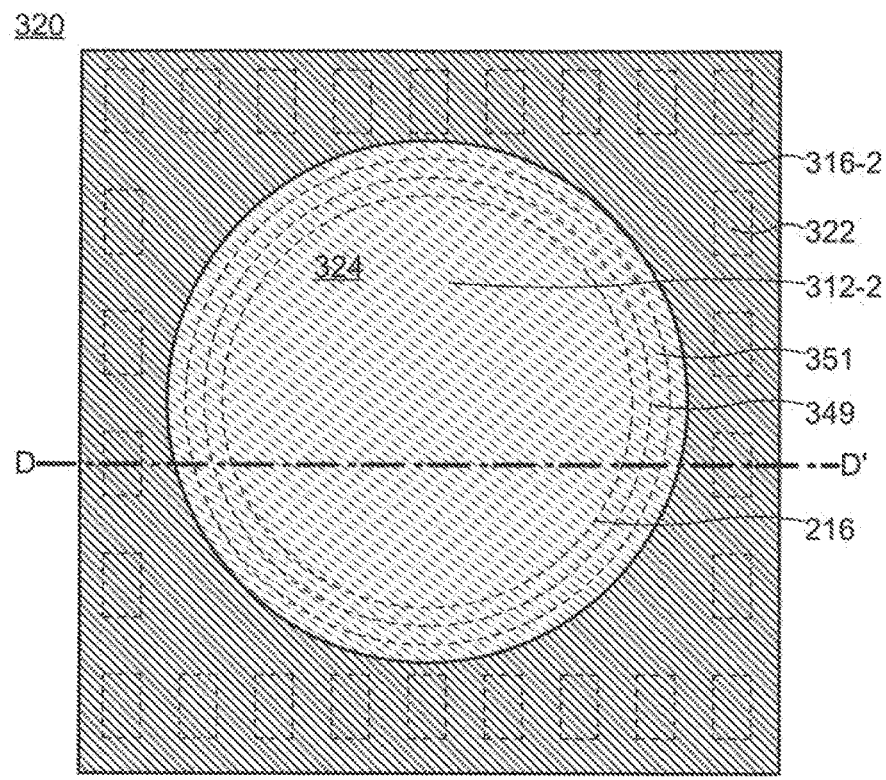
FIG. 8A and FIG. 8B are schematic top views of a display device according to an embodiment of the present invention.
Figure 8B:
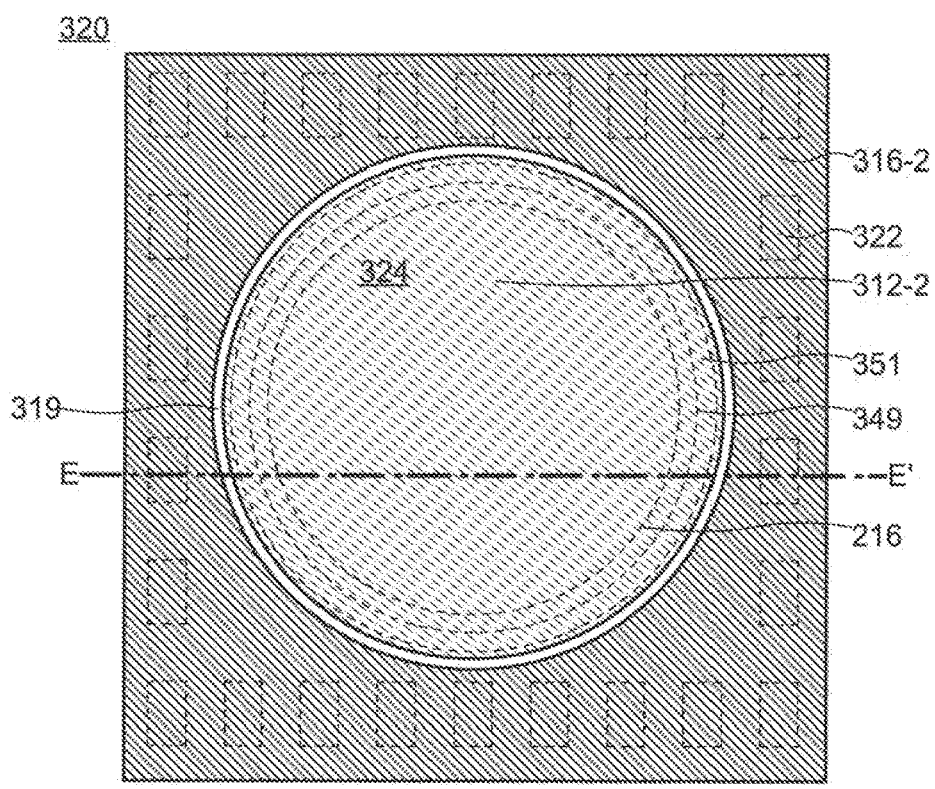
Figure 9A:
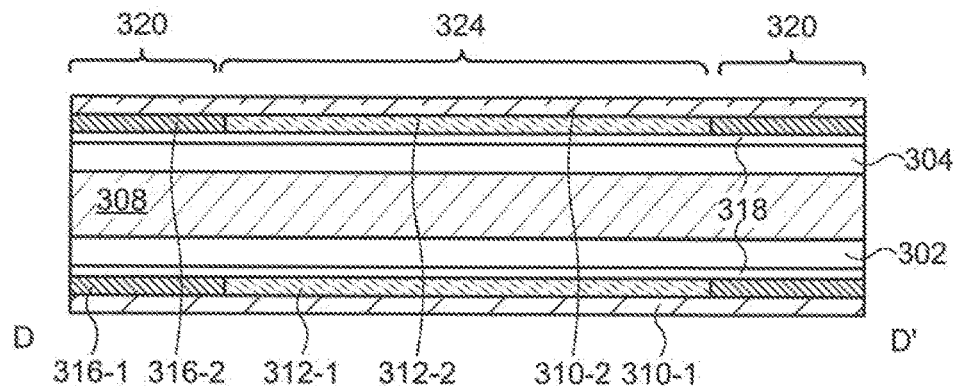
FIG. 9A and FIG. 9B are schematic cross-sectional views of a display device according to an embodiment of the present invention.
Figure 9B:
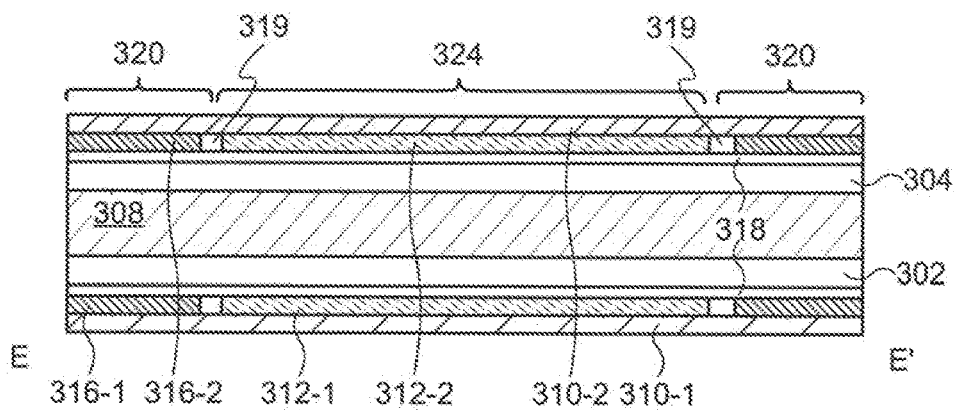
Figure 9C:
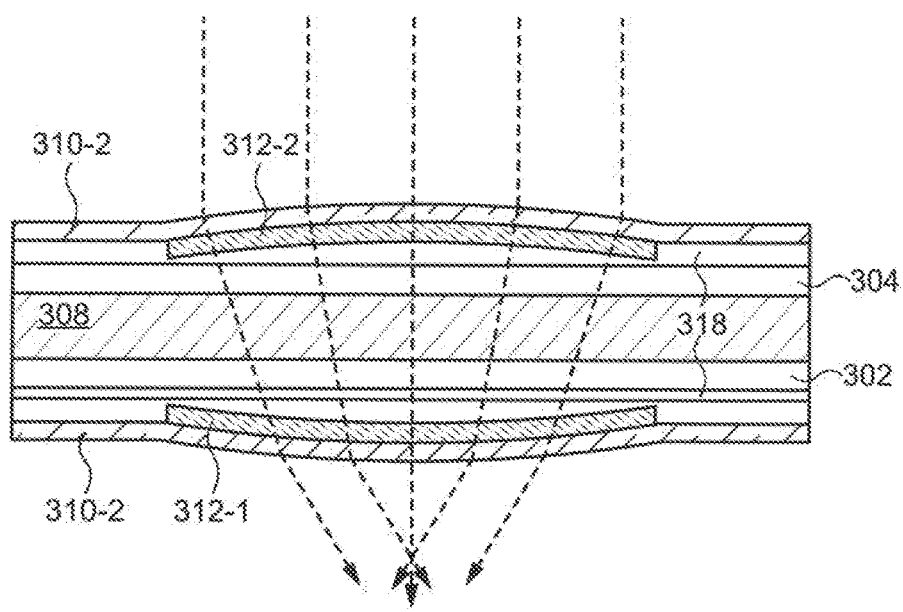
FIG. 9C is a schematic cross-sectional view showing optical properties of a dimming element.

The positional relationships between the λ/4 plate 312 and the resin film 316 in the dimming element 324 and the display region 320 are explained using FIG. 8A to FIG. 9B. FIG. 8A and FIG. 8B are schematic top views of the dimming element 324 and a part of the display region 320 surrounding the dimming element 324. Here, the linear polarizing plate 310 is not illustrated, while the second λ/4 plate 312-2 and the second resin film 316-2 are illustrated. FIG. 9A and FIG. 9B are respectively schematic cross-sectional views along chain lines D-D' and E-E' in FIG. 8A and FIG. 8B. The detailed structures such as the pixel circuits provided on the array substrate 302 are omitted.

As shown in FIG. 8A and FIG. 8B, the resin film 316 is provided with the opening overlapping with the photoelectric transducer 400 and the through hole 216 (see FIG. 2), and the λ/4 plate 312 is arranged in this opening. In other words, the λ/4 plate 312 is surrounded by the resin film 316 in each optical unit. As demonstrated in FIG. 8A and FIG. 9A, the λ/4 plate 312 may be in contact with the resin film 316. Alternatively, the λ/4 plate 312 may be spaced from the resin film 316 through a gap 319 as shown in FIG. 8B and FIG. 9B.

Here, a thickness of the resin film 316 and a thickness of the λ/4 plate 312 are preferred to be the same or substantially the same as each other. Namely, it is preferred that an upper surface and a lower surface of the resin film 316 respectively exist on the same plane as an upper surface and a lower surface of the λ/4 plate in each optical unit. Alternatively, it is preferred to adjust the thickness of the resin film 316 and the thickness of the λ/4 plate 312 so that differences in height (a difference in distance from the surface of the array substrate 302 or the counter substrate 304) between the upper surfaces of the resin film 316 and the λ/4 plate 312 and between the lower surfaces of the resin film 316 and the λ/4 plate 312 are equal to or more than 0 μm and equal to or less than 10 μm, equal to or more than 0 μm and equal to or less than 5 Jim, or equal to or more than 0 μm and equal to or less than 3 The flatness of the linear polarizing plate 310 can be maintained with this structure.

As described below for the operation of the display device 100, it is possible to operate the pixels 322 and the dimming element 324 even if the display device 100 is structured without the resin film 316 in each optical unit. In this case, however, it is not always easy to secure the flatness of the λ/4 plate 312 or the linear polarizing plate 310 when the optical unit is fixed to the array substrate 302 or the counter substrate 302, and a depression or a projection may be formed in the λ/r plate 312 or the linear polarizing plate 310 due to the thicknesses of the λ/4 plate 312 (see FIG. 9C). When the depression or the projection is irregularly formed, the light passing through the dimming element 324 is randomly refracted at the interface between air and the second linear polarizing plate 310-2, generating unevenness of light emitted from the dimming element 324. Moreover, when an image-capturing element is arranged under the dimming element 324 as the photoelectric transducer 400, the captured image is distorted.

On the other hand, it is possible to secure high surface flatness on the λ/4 plate 312 and the linear polarizing plate 310 by disposing the resin film 316 having the opening overlapping with the dimming element 324 so as to cover the display region 320 and arranging the λ/4 plate 312 in this opening (FIG. 9A and FIG. 9B). As a result, the light passing through the dimming element 324 is not adversely influenced by the depression and projection, which allows the photoelectric transducer 400 such as an image-capturing element to capture a high quality image without distortion through the dimming element 324.

3. Operation

Figure 10A:
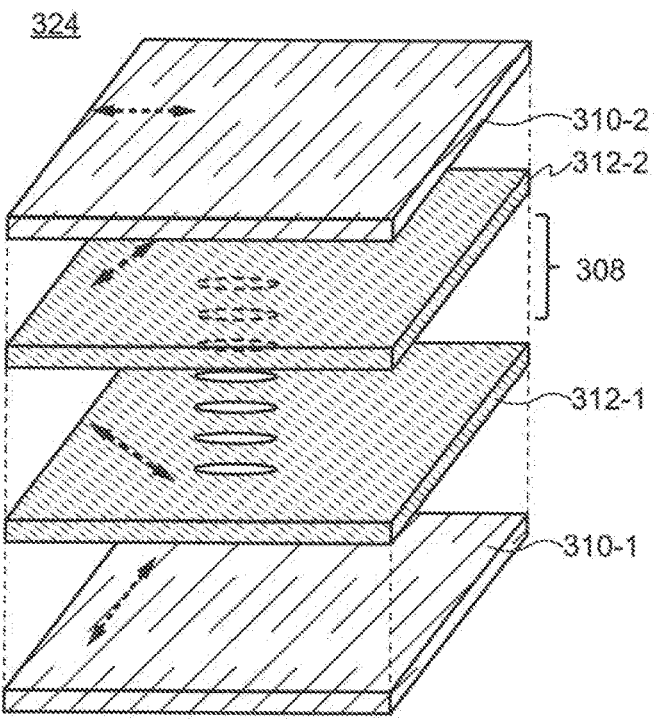
FIG. 10A and FIG. 10B are schematic perspective views for explaining operation of a display device according to an embodiment of the present invention.
Figure 10B:
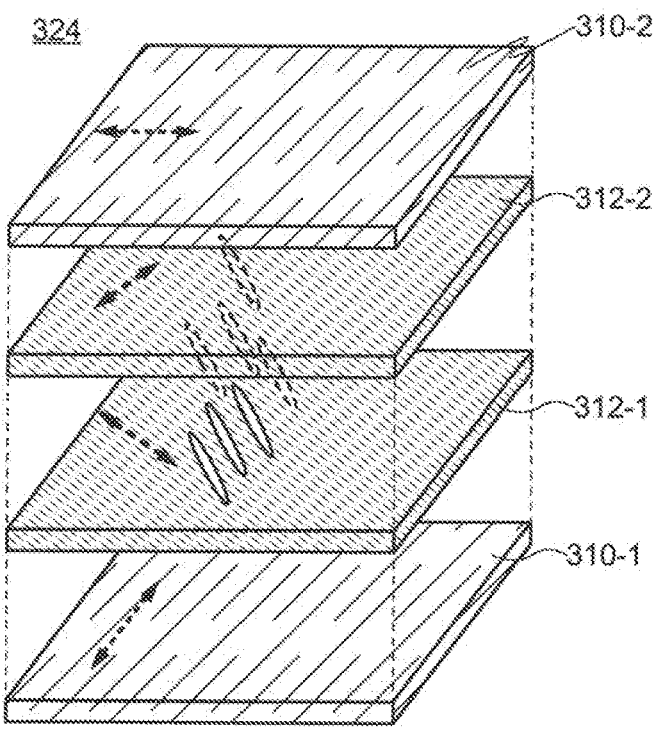

Operation of the dimming element 324 is explained using FIG. 10A and FIG. 10B, whereas operation of the pixel 322 is explained using FIG. 11A and FIG. 11B. For visibility, the upper electrode 351 and the lower electrode 349 in the dimming element 324 are not illustrated in these figures. Although the linear polarizing plates 310 and the λ/4 plates 312 are separately illustrated, this is merely for convenience of explanation, and these items may be in contact with each other. The dotted arrows shown over the linear polarizing plates 310 and the λ/4 plates 312 respectively express the transmission axis and the slow axis thereof, and the solid arrows express the polarizing direction of the light.

3-1. Dimming Element (1) Initial State

A schematic perspective view of the dimming element 324 in the initial state, i.e., in an off state, is shown in FIG. 10A. In this state, the orientation of the liquid crystal molecules illustrated as ellipses is determined by the orientation treatment directions of the first orientation film 370-1 and the second orientation film 370-2. Since the orientation treatment directions of the first orientation film 370-1 and the second orientation film 370-2 are the same as each other, the liquid crystal molecules substantially orient along the orientation treatment directions in the absence of an electric field.

Here, a case is considered where the light proceeds from the array substrate 302 side (i.e., the side of the first linear polarizing plate 310-1) toward the counter electrode 304 side (i.e., the side of the second linear polarizing plate 310-2). This light indicated by the hollow arrow becomes linearly polarized light (a) when passing through the first linear polarizing plate 310-1. When this linearly polarized light (a) enters the first λ/4 plate 312-1, the phase shifts by π/2 because the slow axis of the first λ/4 plate 312-1 shifts from the transmission axis of the first linear polarizing plate 310-1 by 45°. As a result, the light becomes circularly polarized light (b) when passing through the first λ/4 plate 312-1. When this circularly polarized light (b) passes through the liquid crystal layer 308, this light becomes inverted circularly polarized light (c) because the phase is π-retarded due to the anisotropy of the refractive index of the liquid crystal molecules included in the liquid crystal layer 308. When this circularly polarized light (c) further enters the second λ/4 plate 312-2, this light is −π/2-retarded because the transmitting axes of the first λ/4 plate 312-1 and the second λ/4 plate 312-2 are in an orthogonal relationship. As a result, the phase difference from the light incident on the first λ/4 plate 312-1 becomes π, and therefore, the circularly polarized light (c) becomes linearly polarized light (d). The polarizing axis of the linearly polarized light (d) perpendicularly intersects with that of the polarized light (a) formed by the first linear polarizing plate 310-1. Since the first linear polarizing plate 310-1 and the second linear polarizing plate 310-2 are in a cross Nichol relationship with each other, the linearly polarized light (d) is capable of passing through the second linear polarizing plate 310-2. The same is applied when the outside light proceeds from the counter substrate 304 side to the array substrate 302 side. Thus, the outside light is capable of passing through the first linear polarizing plate 310-1. Hence, the light can pass through the dimming element 324, and the dimming element 324 functions as the so-called normally white element.

(2) Operation

A schematic perspective view of the dimming element 324 in the case where a potential difference is provided between the lower electrode 349 and the upper electrode 351, that is, in an on state, is illustrated in FIG. 10B. When this potential difference exceeds a threshold voltage, the liquid crystal molecules begin to rise from the surface of the array substrate 302, and the tilt angle thereof increases with increasing potential difference. Thus, the birefringence decreases with respect to the light incident on the liquid crystal molecules. When the birefringence is 0, the circularly polarized light (b) generated when passing through the first λ/4 plate 312-1 enters the second linear polarizing plate 310-2 while maintaining its polarization property. Although this circularly polarized light (c) is converted into the linearly polarized light (d) by the second linear polarizing plate 310-2, the polarizing axis at this time is the same as the polarizing axis of the linearly polarizing light (a) formed by the first linear polarizing plate 310-1 and perpendicularly intersects with the transmission axis of the second linear polarizing plate 310-2. Therefore, the light incident on the first linear polarizing plate 310-1 cannot pass through the dimming element 324. The behavior of the outside light incident on the second linear polarizing plate 310-2 is also the same and cannot pass through the first linear polarizing plate 310-1.

The birefringence of the liquid crystal molecules with respect to the light incident on the liquid crystal molecules is controlled by the tilt angle of the liquid crystal molecules, and the tilt angle is determined by the potential difference provided between the upper electrode 351 and the lower electrode 349. Therefore, the control of this potential difference using the dimming-controlling signal enables the transmissivity of the dimming element 324 to be adjusted.

As described above, the through hole 216 formed in the light-guiding plate 204 and the reflecting plate 202 is located in the region where the dimming element 324 is provided. Hence, when the dimming element 324 is in an off state (i.e., normally white), the outside light is capable of passing through the dimming element 324, which enables sensing of the outside light, capturing an image, and the like by utilizing the photoelectric transducer 400 arranged in or under the through hole 216. On the other hand, it is possible to adjust the transmissivity of the dimming element 324 by driving the dimming element 324 while controlling the potential difference between the upper electrode 351 and the lower electrode 349, which allows the dimming element 324 to function as a neutral density (ND) filter or a shutter. When the dimming element 324 is allowed to function as a shutter, the outside light reflected by the photoelectric transducer 400 can be shielded. Thus, it is possible to exclude an adverse influence on the display produced by the pixels 322.

In addition, it is not necessary to form a slit or a cutoff in the lower electrode 349 in the dimming element 324 of the display device 100, and the lower electrode 349 has the same thickness across almost all of the dimming element 324. Moreover, the lower electrode 349 is arranged to cover the whole of the through hole 216 or the whole of the light-receiving surface of the photoelectric transducer 400 as described above. Therefore, it is possible to avoid the generation of a refractive index distribution caused by a slit or a cutoff. Moreover, it is possible to secure high surface flatness on the λ/4 plate 312 and the linear polarizing plate 310 by forming the opening overlapping with the dimming element 324 in the resin film 316 and arranging the λ/4 plate 312 in this opening. Hence, no adverse influence is exerted on the outside light incident on the dimming element 324. Accordingly, when an image-capturing element is used as the photoelectric transducer 400, no adverse influence such as generation of a fringe, unevenness, or distortion is exerted on the captured image, and a high-quality image can be obtained.

3-2. Pixel (1) Initial State

A schematic perspective view of the pixel 322 in the off state is shown in FIG. 11A. Similar to the dimming element 324, the orientation of the liquid crystal molecules is determined by the orientation characteristics of the first orientation film 370-1 and the second orientation film 370-2 in this state. Since the orientation treatment directions of the first orientation film 370-1 and the second orientation film 370-2 are the same as each other, the liquid crystal molecules substantially orient along the orientation treatment directions in the absence of an electric field.

Here, a case is considered where the light from the backlight unit 200 is incident on the side of the first linear polarizing plate 310-1 and proceeds toward the side of the second linear polarizing plate 310-2. The light derived from the backlight unit 200 and indicated by the hollow arrow becomes linearly polarized light (a) parallel to the transmission axis when passing through the first linear polarizing plate 310-1. Since no λ/4 plate 312 is provided in the pixel 322, this linearly polarized light (a) is sequentially incident on the liquid crystal layer 308. When the orientation treatment is performed on the orientation films 370 so that the orientation treatment directions perpendicularly intersect with the transmission axis of the first linear polarizing plate 310-1, the polarizing axis of the linearly polarized light (a) almost perpendicularly intersect with the orientation direction of the liquid crystal molecules. Hence, no birefringence appears, and no phase retardation of the light occurs. As a result, the linearly polarized light (a) enters the second linear polarizing plate 310-2 while substantially maintaining its polarizing axis and intensity. However, since the transmission axis of the second linear polarizing plate 310-2 perpendicularly intersects with the polarizing axis of the first linear polarizing plate 310-1, the light incident on the second linear polarizing plate 310-2 (b) is absorbed by the second linear polarizing plate 310-2 and does not radiate from the pixel 322. Therefore, the pixel 322 is in the so-called normally black state in the off state.

(2) Operation

A schematic perspective view of the pixel 322 in the case where a potential difference is provided between the pixel electrode 350 and the common electrode 348, that is in an on state, is illustrated in FIG. 11B. This potential difference generates an electric field substantially parallel to the surface of the array substrate 302, and the liquid crystal molecules rotate in the plane parallel to the surface of the array substrate 302 due to the dielectric anisotropy of the liquid crystal molecules. Hence, the polarizing axis of the linearly polarized light (a) incident on the liquid crystal layer 308 and the orientation direction of the liquid crystal molecules shift from each other, and the phase retardation of the light incident on the liquid crystal layer 308 occurs. Here, the thickness of the liquid crystal layer 308 is controlled according to the refractive indexes of the liquid crystal molecules in the long axis direction and the short axis direction so that the phase retardation is approximately π in the display device 100. Therefore, the light which has passed through the liquid crystal layer 308 becomes the linearly polarized light (b) obtained by rotating the polarizing axis of the linearly polarized light (a). When the orientation of the liquid crystal molecules rotates by 90°, the polarizing axis of this linearly polarized light (b) perpendicularly intersects with the polarizing axis of the linearly polarized light (a). In addition, the first linear polarizing plate 310-1 and the second linear polarizing plate 310-2 are in a cross Nichol relationship. Thus, the linearly polarized light radiating from the liquid crystal layer 308 is capable of passing through the second linear polarizing plate 310-2.

The amount of the extracted light depends on the rotation angle of the liquid crystal molecules, and the rotation angle can be controlled by the potential difference between the pixel electrode 350 and the common electrode 348 based on the potential of the image signal. Hence, gradation can be obtained in each pixel 322 by controlling this potential difference. Moreover, since the color filter 374 with a different optical property is formed in every pixel as described above, it is possible to control the gradation for every color, which enables full-color display on the display region 320.

As described above, since the pixel 322 disposed in the display region 320 is normally off in the display device 100, a display having a high contrast can be realized. Furthermore, since an FFS liquid crystal element is formed in the pixel 322, it is possible to perform display with excellent viewing-angle characteristics. Therefore, high-quality full-color display is attainable by the display device 100.

Moreover, since the dimming element 324 is arranged so as to be surrounded by the pixels 322, the photoelectric transducer 400 such as an image-capturing element can be disposed so as to overlap with the display region 320. Therefore, the photoelectric transducer 400 is not required to be arranged in the frame region, which allows the frame region to be reduced or excluded and an area of the display region 320 relative to the entire display device to be increased. As a result, an electric apparatus with a large display region 320 and excellent designability can be provided. In addition, it is also possible to control the light transmissivity of the dimming element 324, the amount of the light incident on the photoelectric transducer 400 can be appropriately adjusted without decreasing display quality caused by the dimming element 324.

4. Modified Example

Figure 12A:
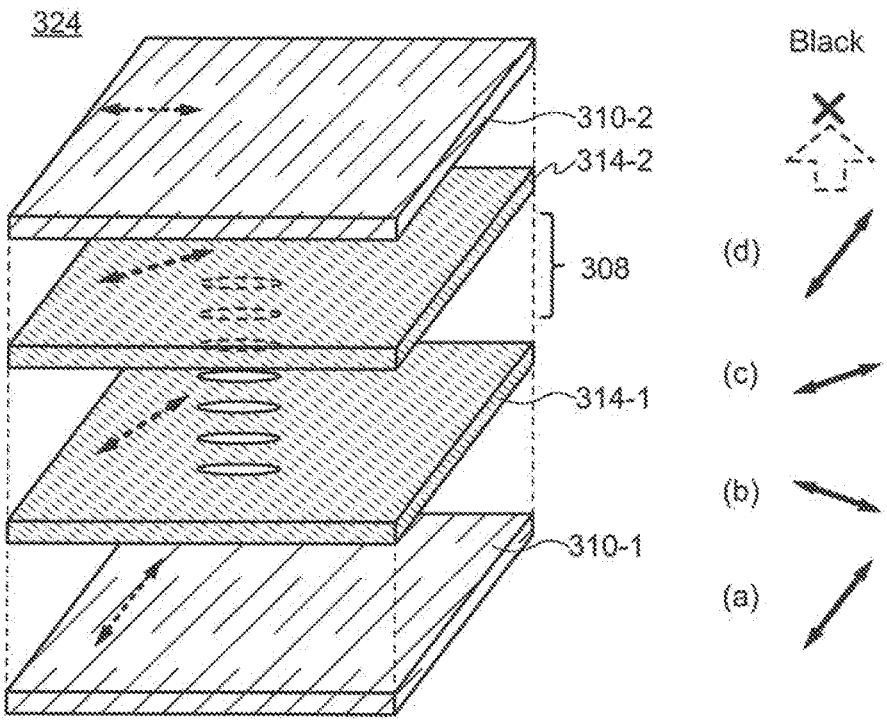
FIG. 12A and FIG. 12B are schematic perspective views for explaining operation of a display device according to an embodiment of the present invention.
Figure 12B:
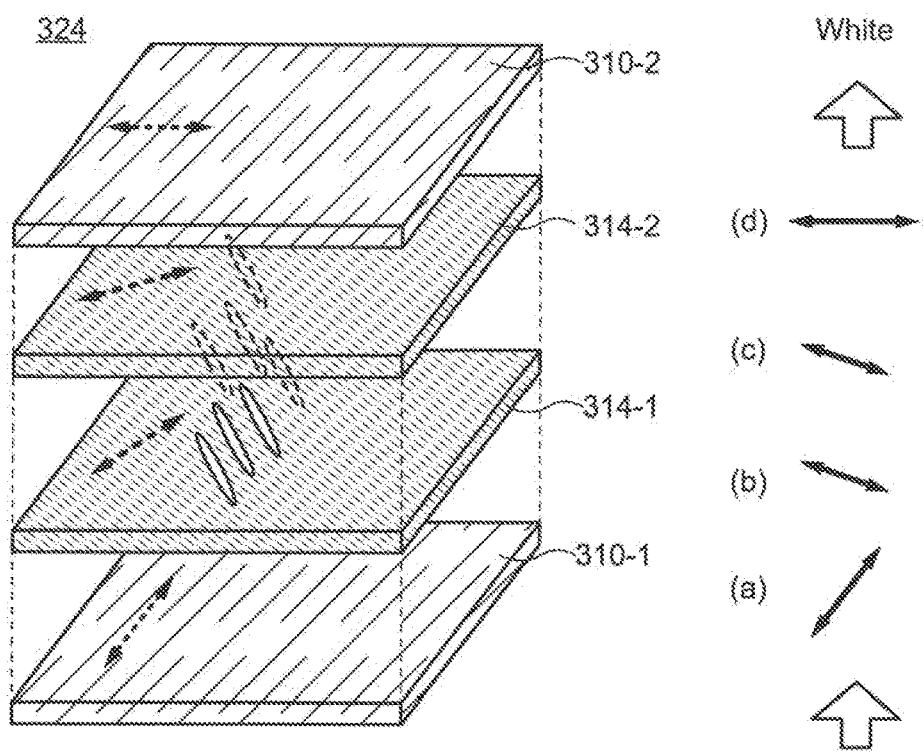

The display device 100 may include a pair of halfwave plates (hereinafter, referred to as a λ/2 plate) 314 instead of the pair of λ/4 plates 312. The structure and operation in this case are explained using FIG. 12A and FIG. 12B. FIG. 12A and FIG. 12B are respectively schematic perspective views of the display device 100 in the initial state and in operation and respectively correspond to FIG. 10A and FIG. 10B.

The pair of λ/2 plates 314 is disposed so as to sandwich the dimming element 324 and is sandwiched by the pair of linear polarizing plates 310. The λ/2 plate (first λ/2 plate 314-1) arranged on the side of the array substrate 302 is arranged so that the slow axis thereof shifts from that of the first linear polarizing plate 310-1 by 22.5°. Similarly, the λ/2 plate (second λ/2 plate 314-2) arranged on the side of the counter substrate 304 is also arranged so that the slow axis thereof shifts from that of the second linear polarizing plate 310-2 by 22.5°. Hence, the slow axes of the λ/2 plates 314 are in an orthogonal relationship with each other, and the pair of linear polarizing plates 310 is also in a cross Nichol relationship.

4-1. Initial State

Similar to the case using the pair of λ/4 plates 312 (FIG. 10A), the liquid crystal molecules substantially orient along the orientation treatment direction in the off state (FIG. 12A). The light proceeding from the side of the linear polarizing plate 310-1 becomes linearly polarizing light (a) parallel to the transmission axis when passing through the first linear polarizing plate 310-1. The phase π-shifts when this linearly polarized light (a) sequentially enters the first λ/2 plate 314-1. However, since the slow axis of the first λ/2 plate 314-1 shifts from the transmission axis of the first linear polarizing plate 310-1 by 22.5°, the linearly polarized light (a) which has passed through the first λ/2 plate 314-1 becomes the linear polarizing light (b) having a polarizing axis shifted from the transmission axis of the first linear polarizing plate 310-1 by −π/2, that is, 45°. When this linearly polarized light (b) passes through the liquid crystal layer 308, phase retardation further occurs. Here, the thickness of the liquid crystal layer 308 is controlled according to the refractive indexes of the liquid crystal molecules in the long axis direction and the short axis direction so that the phase retardation is approximately 7 in the display device 100. Hence, the polarizing axis further shifts by 90°, and the linearly polarized light (b) becomes linearly polarizing light (c) when the linearly polarized light (b) passes through the liquid crystal layer 308. When this linearly polarizing light (c) further enters the second λ/2 plate 314-2, a π phase difference arises. However, since the slow axis of the second λ/2 plate 314-2 shifts from the transmission axis of the second linear polarizing plate 310-2 by 25.5°, a π/2 phase difference is provided. As a result, the polarizing axis shifts by 45°, and the linearly polarized light (c) becomes linearly polarized light (d) having a polarizing axis perpendicularly intersecting with the transmission axis of the first linear polarizing plate 310-1. Since the polarizing axis of the linearly polarizing light (d) perpendicularly intersects with the transmission axis of the second linear polarizing plate 310-2, the light cannot pass through the second linear polarizing plate 310-2. Thus, the dimming element 324 is in the so-called normally black state in the off state.

4-2. Operation

When the potential difference provided between the lower electrode 349 and the upper electrode 351 exceeds a threshold voltage, the liquid crystal molecules begin to rise from the surface of the array substrate 302, and the tilt angle thereof increases with increasing potential difference. Thus, the birefringence decreases with respect to the light incident on the liquid crystal molecules. When the birefringence is 0, the polarization property of the linearly polarized light (b) generated when passing through the first λ/2 plate 314-1 is maintained, and the linearly polarized light (c) is incident on the second λ/2 plate 314-2. This linearly polarized light (c) is converted into linearly polarized light (d) by the second λ/2 plate 314-2. However, since the slow axis of the second λ/2 plate 314-2 shifts from the transmission axis of the second linear polarizing plate 310-2 by 22.5°, the polarizing axis thereof is the same as the transmission axis of the second linear polarizing plate 310-2. Therefore, this linearly polarized light (d) is capable of passing through the second linear polarizing plate 310-2. Similarly, the behavior of the light incident from the second linearly polarizing plate 310-2 is able to pass through the first linear polarizing plate 310-1.

The birefringence of the liquid crystal molecules with respect to the light incident on the liquid crystal molecules is controlled by the tilt angle of the liquid crystal molecules, and the tilt angle is determined by the potential difference provided between the upper electrode 351 and the lower electrode 349. Therefore, the control of this potential difference using the dimming-controlling signal enables the transmissivity of the dimming element 324 to be adjusted. For example, when the dimming element 324 is in an off state (i.e., in a normally black state), the outside light reflected by the photoelectric transducer 400 can be shielded because the outside light cannot pass through the dimming element 324, which prevents an adverse influence on the display produced by the pixels 322. In addition, the transmissivity of the dimming element 324 can be adjusted by operating the dimming element 324 with a controlled potential difference between the upper electrode 315 and the lower electrode 349, which allows the dimming element 324 to function as an ND filter or a shutter. Hence, it is possible to optimize the amount of the light incident on the photoelectric transducer 400 by appropriately controlling the potential difference between the upper electrode 351 and the lower electrode 349 depending on the external environment.

Moreover, since the single lower electrode 349 is arranged so as to cover the whole of the through hole 216 or the whole of the light-receiving surface of the photoelectric transducer 400, it is possible to avoid generation of a refractive-index distribution. In addition, the high surface flatness can be secured on the λ/2 plate 314 and the linear polarizing plate 310 by forming the opening overlapping with the dimming element 324 in the resin film 316 and arranging the λ/2 plate 314 in this opening as described above. Hence, the outside light incident on the dimming element 324 is not irregularly refracted, and a high-quality image can be obtained without exerting any adverse influence such as generation of a fringe, unevenness, or distortion on the image captured by the photoelectric transducer 400.

Second Embodiment

An example of a manufacturing method of the display device 100 having the structure described in the First Embodiment is explained in the present embodiment. An explanation of the structures the same as or similar to those described in the First Embodiment may be omitted.

FIG. 13A to FIG. 17 are schematic cross-sectional views showing the manufacturing method of the display device 100. In each drawing, the left side and the right side respectively demonstrate a part of the pixel 322 and a part of the dimming element 324.

1. Array Substrate

FIG. 13A is a schematic view in which the components up to the interlayer insulating film 364 are formed over the array substrate 302. An explanation is omitted because this structure can be fabricated by applying the known methods and materials.

Etching is performed on the interlayer insulating film 364 to form openings reaching the semiconductor film 352, and a metal film is prepared to cover these openings. The metal film can be formed by stacking films including a metal such as molybdenum, tungsten, titanium, or aluminum with a sputtering method, a chemical vapor deposition (CVD) method, and the like. After that, the metal film is subjected to etching processing to form the image-signal line 342, the drain electrode 354, and the dimming-controlling element 358 (FIG. 13B). With this process, the transistor 346 is fabricated. As described above, the part of the image-signal line 342 functions as the source electrode of the transistor 346.

After that, the leveling film 366 is formed so as to cover the transistor 346 and the dimming-controlling line 358 (FIG. 13C). The leveling film is formed by applying a precursor of the polymer described in the First Embodiment with a wet-type film formation method such as a spin-coating method, a dip-coating method, an ink-jet method, and a printing method, and then curing the precursor.

After that, the common electrode 348 is fabricated over the leveling film 366 (FIG. 13C). The common electrode 348 is configured so as to transmit visible light. Therefore, the common electrode 348 may be formed with a sputtering method and the like using a conductive oxide exhibiting transmitting properties with respect to visible light, such as a mixed oxide of indium and tin (ITO) and a mixed oxide of indium and zinc (IZO). Although not illustrated, the power-source line 344 is formed after forming the common electrode 348. The power-source line 344 is fabricated by stacking the films including the aforementioned metal with a sputtering method, a CVD method, or the like. Although not illustrated, when the dimming element 324 forms an FFS liquid crystal element, the lower electrode 349 may be simultaneously formed when the common electrode 348 is formed. Hence, the common electrode 348 and the lower electrode 349 can exist in the same layer and have the same composition and thickness in this case.

Figure 14A:
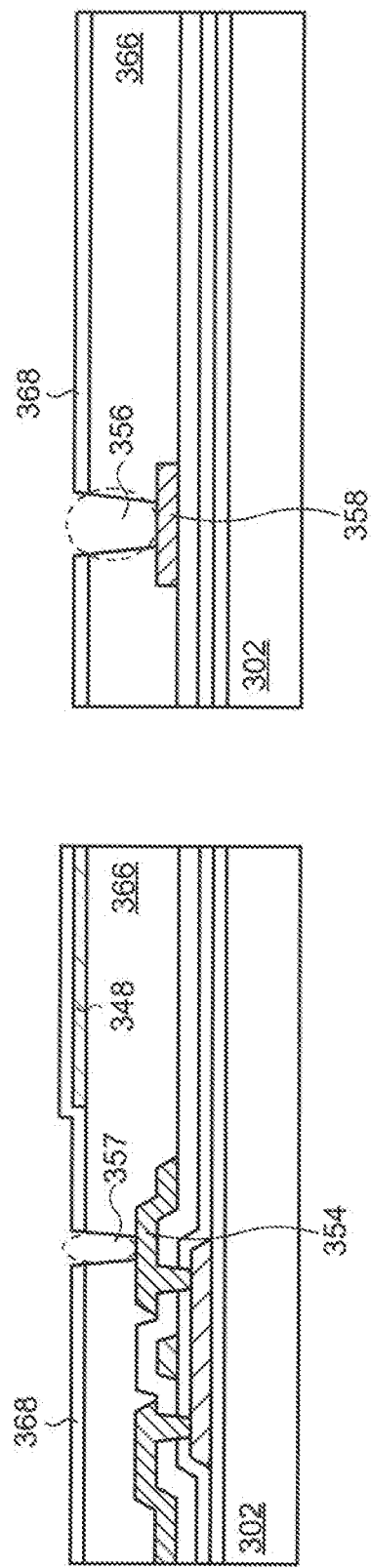
FIG. 14A and FIG. 14B are schematic cross-sectional views showing a manufacturing method of a display device according to an embodiment of the present invention.

After that, the interelectrode insulating film 368 is formed so as to cover the common electrode 348 and the dimming-controlling line 358 (FIG. 14A). The interelectrode insulating film 368 includes the aforementioned silicon-containing inorganic compound and is formed using a CVD method or a sputtering method. Next, etching is performed on the interelectrode insulating film 368 and the leveling film 366 to form the openings 357 and 356 respectively reaching the drain electrode 354 and the dimming-controlling line 358 (FIG. 14A).

Figure 14B:
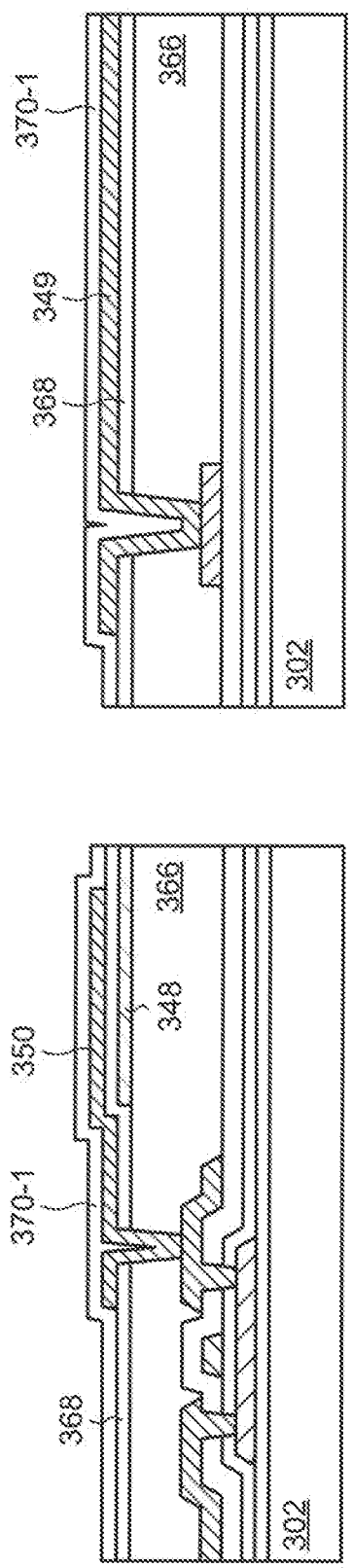

After that, the pixel electrode 350 and the lower electrode 349 are fabricated so as to be in contact with the drain electrode 354 and the dimming-controlling line 358, respectively (FIG. 14B). These electrodes are also preferred to have a high transmitting property with respect to visible light, and therefore, may be formed with a sputtering method using a conductive oxide having a light-transmitting property, such as ITO and IZO. Since the pixel electrode 350 and the lower electrode 349 can be simultaneously formed, these electrodes can exist in the same layer and have the same composition and thickness. Although not illustrated, when the dimming element 324 forms an FFS liquid crystal element, the upper electrode 351 may be simultaneously formed when the pixel electrode 350 is fabricated. Therefore, the pixel electrode 350 and the upper electrode 351 can exist in the same layer and have the same composition and thickness in this case.

After that, the first orientation film 370-1 is formed so as to cover the pixel electrode 350 and the lower electrode 349 (FIG. 14B). The first orientation film 370-1 may be formed by applying a polyimide precursor with a wet-type film formation method, curing the precursor, and then performing a rubbing treatment, for example. The known methods may be applied in the rubbing treatment.

2. Counter Electrode

The color filter 374 and the black matrix 376 are formed over the counter substrate 304 (FIG. 15A). The black matrix 376 is prepared so as to cover the transistor 346, the image-signal line 342, the gate line 340, and the like in the pixel 322, while the black matrix 376 is prepared so as to cover the dimming-controlling line 358 in the dimming element 324. No color filter 374 may be disposed in the dimming element 324. In the case where the overcoat 372 is formed, the overcoat 372 is formed so as to cover the color filter 374 and the black matrix 376 (FIG. 15B). The color filter 374, black matrix 376, and overcoat 374 can be prepared using the known methods and materials. Thus, a detailed explanation is omitted.

After that, the upper electrode 351 of the dimming element 324 is fabricated (FIG. 15C). The upper electrode 351 may be formed by applying the same method for the fabrication of the lower electrode 349, the common electrode 348, and the pixel electrode 350. After that, the second orientation film 370-2 is formed so as to cover the color filter 374, the black matrix 376, and the upper electrode 351. The second orientation film 370-2 may be also formed with the same method as that of the first orientation film 370-1. The spacer 378 which is an optional element is formed over the second orientation film 370-2 by applying the known methods and materials (FIG. 15C). The spacer 378 may be fabricated over the first orientation film 370-1 formed over the array substrate 302.

3. Cell Fabrication

Figure 16:
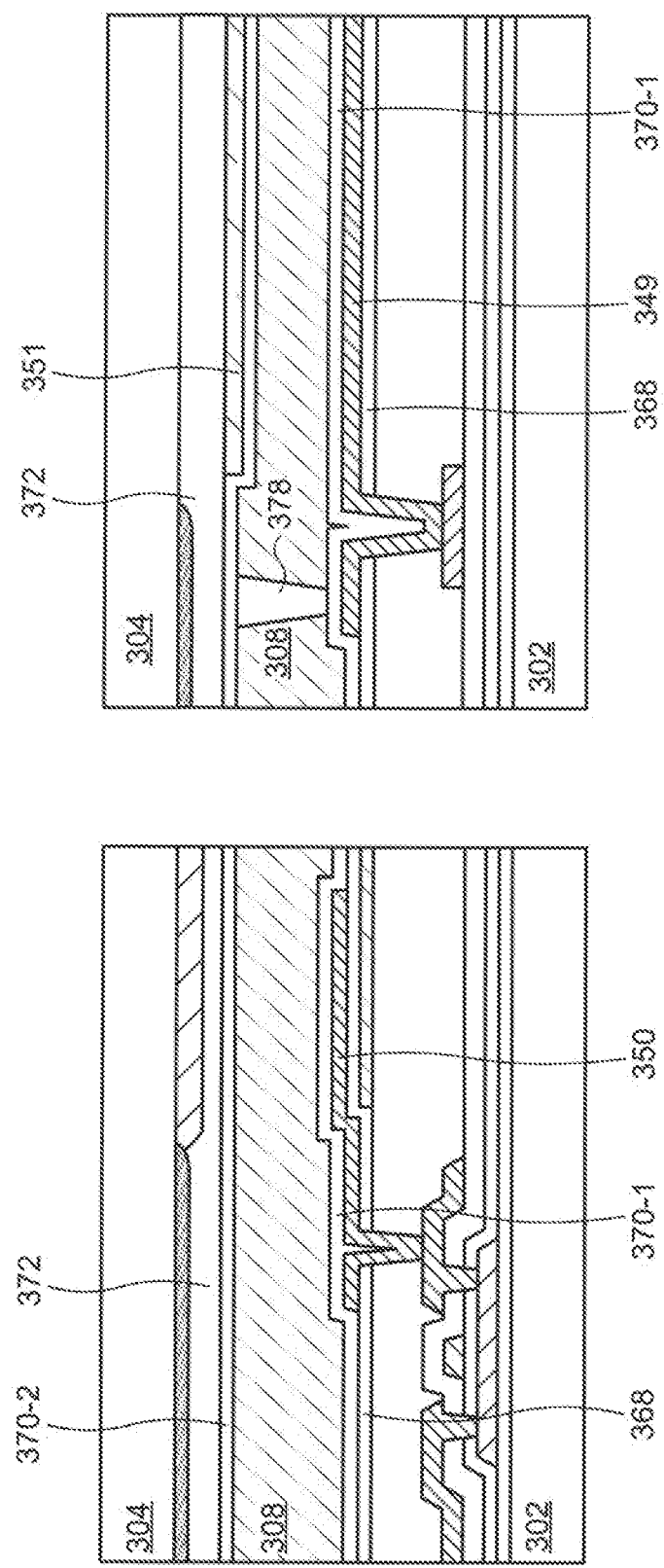
FIG. 16 is a schematic cross-sectional view showing a manufacturing method of a display device according to an embodiment of the present invention.

After that, the liquid crystal layer 308 is formed. Specifically, the sealing material 306 is applied over one of the array substrate 302 and the counter substrate 304, and the liquid crystal is dripped on the region formed by the sealing material 306. After that, the other of the array substrate 302 and the counter substrate 304 is arranged over the liquid crystal and the sealing film 306 so that the pixel electrode 350, the common electrode 348, the lower electrode 349, and the upper electrode 351 are sandwiched by the array substrate 302 and the counter substrate 304, and then the sealing material 306 is cured. At this time, the pixel electrode 350 and the common electrode 348 do not overlap with the upper electrode 351 and are exposed from the upper electrode 351. With this process, the array substrate 302 and the counter electrode 304 are bonded and fixed to each other (FIG. 16). Alternatively, the array substrate 302 and the counter electrode 304 are bonded using the sealing material 306 in advance. In this case, the sealing material 306 is formed so as not to have a closed shape but to be divided into two portions. After curing the sealing material 306, the liquid crystal is injected from the gap between the separated two sealing materials 306, the sealing material 306 is further applied between the cured sealing films 306, and then the sealing film 306 is cured. With this process, the sealing film 306 provides a single closed shape. Note that, when the spacer 378 is not fabricated, particle spacers may be mixed in the liquid crystal.

Figure 17:
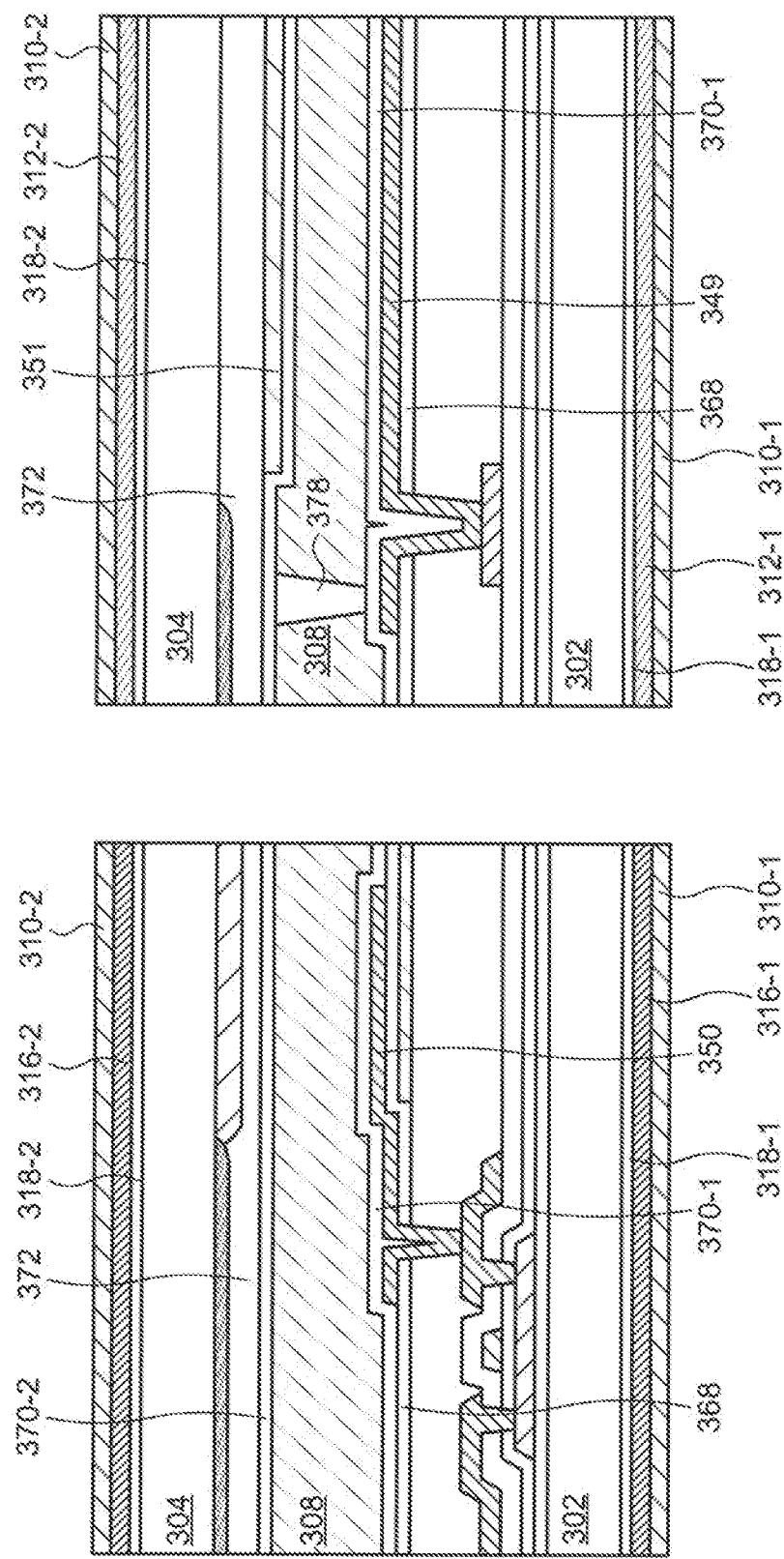
FIG. 17 is a schematic cross-sectional view showing a manufacturing method of a display device according to an embodiment of the present invention.

After that, the pair of optical units each having the stacked resin film 316, λ/4 plate 312, and the linear polarizing plate 310 is respectively fixed to the lower surface of the array substrata 302 and the upper surface of the counter substrate 304 using the adhesive layers 318 (FIG. 17). Specifically, the pair of optical units each structured by the adhesive layer 318, the resin film 316 over the adhesive layer 318, the λ/4 plate 312 located over the adhesive layer 318 and arranged in the opening of the resin film 316, and the linear polarizing plate 310 stacked over the resin film 316 and the λ/4 plate 312 is fixed so that the adhesive layers 318 are respectively in contact with the array substrate 302 and the counter substrate 304. The pair of optical units is fixed so that the λ/4 plates 312 overlap with the dimming element 324.

Through the aforementioned processes, the display module 300 is fabricated. The display device 100 can be manufactured by arranging and fixing this display module 300 over the backlight unit 200 with a known method.

Implementation of the embodiments of the present invention, a display device with a small frame region and a wide display region can be produced. Since a variety of photoelectric transducers can be mounted so as to overlap with the display region in this display device, the embodiments of the present invention provide a high degree of freedom in designing a display device. In addition, it is possible to control the amount of light incident on the photoelectric transducer without reduction of display quality by controlling transmissivity of the dimming element disposed in the display region and overlapping with the photoelectric transducer.

Furthermore, since the single lower electrode 349 is arranged so as to cover the whole of the through hole 216 or the whole of the light-receiving surface of the photoelectric transducer 400, generation of the refractive index distribution can be avoided. Moreover, it is possible to capture a high quality image through the display region 320 without exerting any adverse influence such as generation of a fringe, unevenness, or distortion on the image captured by the photoelectric transducer 400 because employment of the optical unit having the aforementioned structure prevents irregular refraction of the outside light incident on the dimming element 324.

It is understood that another effect different from that provided by each of the aforementioned embodiments is achieved by the present invention if the effect is obvious from the description in the specification or readily conceived by persons ordinarily skilled in the art.

What is claimed is:

1. A display device comprising:
    an array substrate;
    a liquid crystal layer over the array substrate;
    a counter substrate over the liquid crystal layer;
    a first resin film under the array substrate, the first resin film having a first opening overlapping with the liquid crystal layer;
    a first wavelength plate in the first opening; and
    a first linear polarizing plate under and overlapping with the first resin film and the first wavelength plate.

2. The display device according to claim 1,
    wherein the first resin film is in contact with the first wavelength plate.

3. The display device according to claim 1,
    wherein the first resin film is spaced apart from the first wavelength plate.

4. The display device according to claim 1,
    wherein a lower surface of the first resin film and a lower surface of the first wavelength plate exist in the same layer as each other.

5. The display device according to claim 1, further comprising:
    a second resin film over the counter substrate, the second resin film having a second opening;
    a second wavelength plate in the second opening; and
    a second linear polarizing plate over and overlapping with the second resin film and the second wavelength plate.

6. The display device according to claim 5,
    wherein the second resin film is in contact with the second wavelength plate.

7. The display device according to claim 5,
    wherein the second resin film is spaced apart from the second wavelength plate.

8. The display device according to claim 5,
    wherein an upper surface of the second resin film and an upper surface of the second wavelength plate exist in the same layer as each other.

9. The display device according to claim 1,
    wherein the array substrate comprises:
        a pixel including a first electrode, a second electrode, and the liquid crystal layer; and
        a dimming element including a third electrode, a fourth electrode, and the liquid crystal layer, and
    the pixel and the dimming element respectively overlap with the first resin film and the first wavelength plate.

10. The display device according to claim 5,
    wherein the array substrate comprises:
        a pixel including a first electrode, a second electrode, and the liquid crystal layer; and
        a dimming element including a third electrode, a fourth electrode, and the liquid crystal layer, and
    the pixel and the dimming element respectively overlap with the second resin film and the second wavelength plate.

11. The display device according to claim 9,
    wherein the pixel and the dimming element are different in operation mode from each other.

12. The display device according to claim 9,
    wherein the liquid crystal layer is located over the first electrode, the second electrode, and the third electrode and under the fourth electrode.

13. The display device according to claim 9,
    wherein the first electrode is located over the second electrode.

14. The display device according to claim 9,
    wherein the second electrode exists in the same layer as the third electrode.

15. The display device according to claim 9, further comprising an orientation film over the first electrode, the second electrode, and the third electrode and under the liquid crystal layer
    wherein an orientation treatment direction of the orientation film is the same between the pixel and the dimming element.

16. The display device according to claim 5,
    wherein the first wavelength plate and the second wavelength plate are each a λ/4 wavelength plate,
    transmitting axes of the first linear polarizing plate and the second linear polarizing plate perpendicularly intersect each other, and
    slow axes of the first wavelength plate and the second wavelength plate perpendicularly intersect each other.

17. The display device according to claim 5,
    wherein the first wavelength plate and the second wavelength plate are each a λ/2 plate,
    transmitting axes of the first linear polarizing plate and the second linear polarizing plate perpendicularly intersect each other, and
    slow axes of the first wavelength plate and the second wavelength plate perpendicularly intersect each other.

18. The display device according to claim 1, further comprising a backlight including a light-guiding plate under the array substrate,
    wherein the light-guiding plate has a through hole overlapping with the first opening.

19. The display device according to claim 18, further comprising an image-capturing element overlapping with the through hole.

20. The display device according to claim 18, further comprising a photosensor overlapping with the through hole.

* * * * *